United States Patent [19]
Oshima

[11] Patent Number: 5,751,288
[45] Date of Patent: May 12, 1998

[54] PROGRAM DISPLAY METHOD AND DEVICE, AND ALSO PROGRAM GENERATION METHOD AND DEVICE

[75] Inventor: Yoshimitsu Oshima, Tokyo, Japan

[73] Assignee: Hitachi, Ltd., Tokyo, Japan

[21] Appl. No.: 759,156

[22] Filed: Dec. 2, 1996

Related U.S. Application Data

[63] Continuation of Ser. No. 410,580, Mar. 23, 1995, abandoned, which is a continuation of Ser. No. 665,563, Mar. 6, 1991, abandoned.

[30] Foreign Application Priority Data

Mar. 9, 1990 [JP] Japan ................................ 2-056360
Oct. 19, 1990 [JP] Japan ................................ 2-281269

[51] Int. Cl.$^6$ ........................................ G06F 15/00
[52] U.S. Cl. ............................................ 345/357
[58] Field of Search ........................... 395/339, 355, 395/356, 357

[56] References Cited

U.S. PATENT DOCUMENTS

| | | | |
|---|---|---|---|
| 5,146,555 | 9/1992 | Kiyohara | 395/157 |
| 5,179,657 | 1/1993 | Dykstal et al. | 395/161 |
| 5,191,646 | 3/1993 | Naito et al. | 395/161 |

OTHER PUBLICATIONS

Shu, "Visual Programming", 1988, pp. 148–172.
"Novel Expression Method for Program Control Structure: Tree Structure Charts are Under Practical Use", Nikkei Computer, Jan. 9, 1989, pp. 71–83. (English translation unavailable).

Ralph Levien, "Visual Programming A LISP Editor That Lets You Create LISP Programs Visually", BYTE, Feb. 1986, pp. 135, 136, 138, 140, 142 and 144.

S. K. Chang, et al., "Visual Languages", Plenum Press, 1986, p. 52.

Leonard L. Tripp, "A Survey of Graphical Nations for Program Design An Update", ACM SIGSOFT Software Engineering Notes, vol. 13, No. 4, Oct. 1988, pp. 39–45.

Georg Raeder, "A Survey of Current Graphical Programming Techniques", Computer, Aug. 1985, pp. 11–24.

Primary Examiner—Phu K. Nguyen
Attorney, Agent, or Firm—Fay, Sharpe, Beall, Fagan, Minnich & McKee

[57] ABSTRACT

In a program display apparatus, a block portion, an iteration control portion and a data description portion designated by a quote construction are extracted from an inputted program expressed by characters. A relationship of inclusion between these portions and a hierarchical relationship are extracted. Each of these portions is replaced by a figure having, for instance, a rectangular shape, and thereafter displayed on a display screen. When one block portion is included into another block portion, the rectangular figure corresponding to the one block portion is included within the rectangular figure corresponding to another block portion on the display screen. Then, both the inclusive relationship or hierarchical relationship between any two block portions, the iteration control portion and a data description portion designated by a quote instruction of the program may be visualized.

27 Claims, 25 Drawing Sheets

```
(defun factorial (n)                    ...... 1
  (let ((result 1)))                    ...... 2
    (do ((i 1 (1+ i)))                  ...... 3
        ((> i n) result)                ...... 4
      (setq result (* i result)))))     ...... 5
```

LINE NUMBER

FIG. 3a
PRIOR ART
```
     DO 10 I = 1 , 5
       A(I) = B(I) + C(I)
10   CONTINUE
     IF ( X · GT · Y ) THEN
       Z = X
     ELSE
       Z = Y
```
FIG. 3b
PRIOR ART
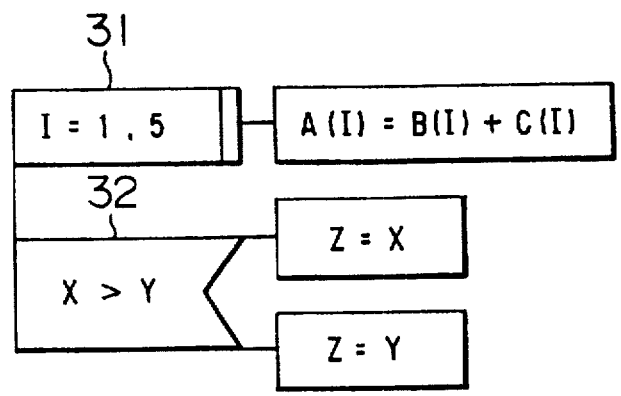
FIG. 3c
PRIOR ART
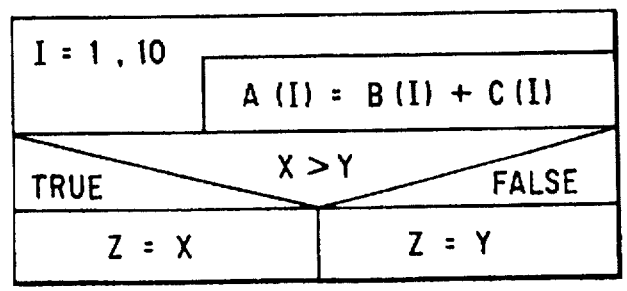

```
                                        LINE
                                        NUMBER
(defun main ()                          ······ 1
  (flet ((fun 1 (a b)                   ······ 2
           (+ a b)                      ······ 3
         ))                             ······ 4
    (let (c)                            ······ 5
      (setq c (fun 1 5 3))              ······ 6
      (let (c)                          ······ 7
        (setq c (fun 1 2 4))            ······ 8
      )                                 ······ 9
      (write c)                         ······ 10
    )                                   ······ 11
  )                                     ······ 12
)                                       ······ 13
```

(cons 3 (quote (plus 5 6)))

F I G. 5a
PRIOR ART
( and  ( not  ( null  y ) )
  ( or  ( and  ( equal  x  ( first  y ) ) y )
    ( member  x  ( rest  y ) ) ) )
F I G. 5b
PRIOR ART
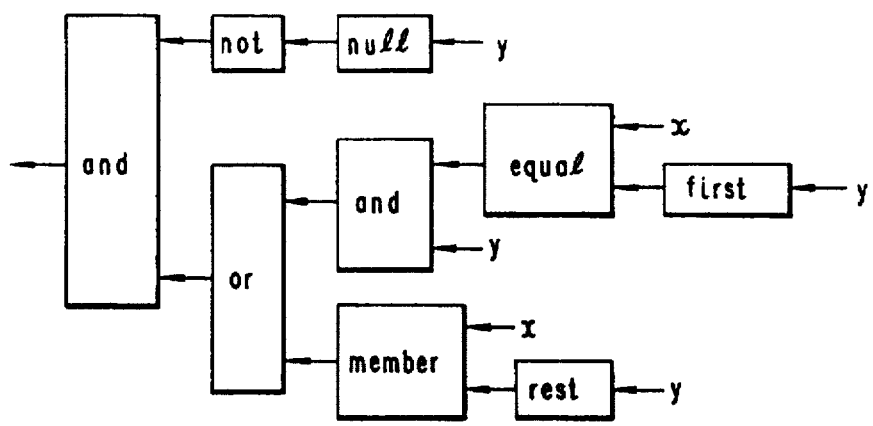
F I G. 5c
PRIOR ART
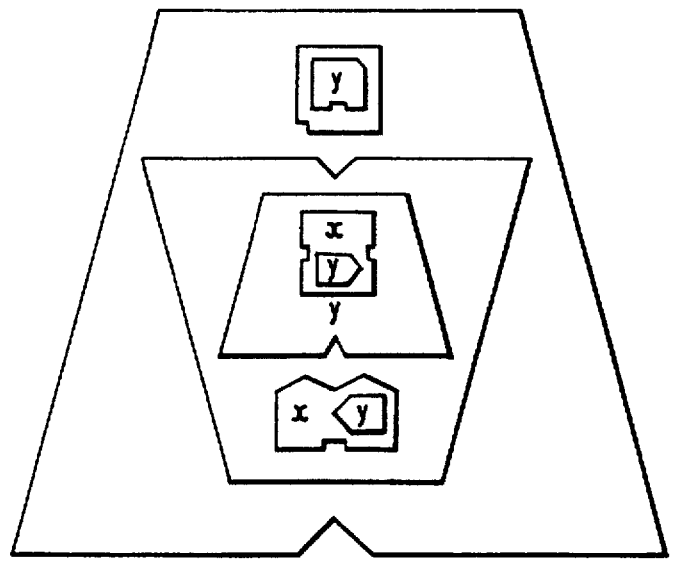

```
(defun main ()
   (flet ((fun 1 (x)
            (flet ((fun 2 (x)
                     ······ ))
               (fun 2 ······ ))
            ······ ))
      (funk
         (fun 1 ······ )
         (fun 1 ······ )))))
```

F I G. 11
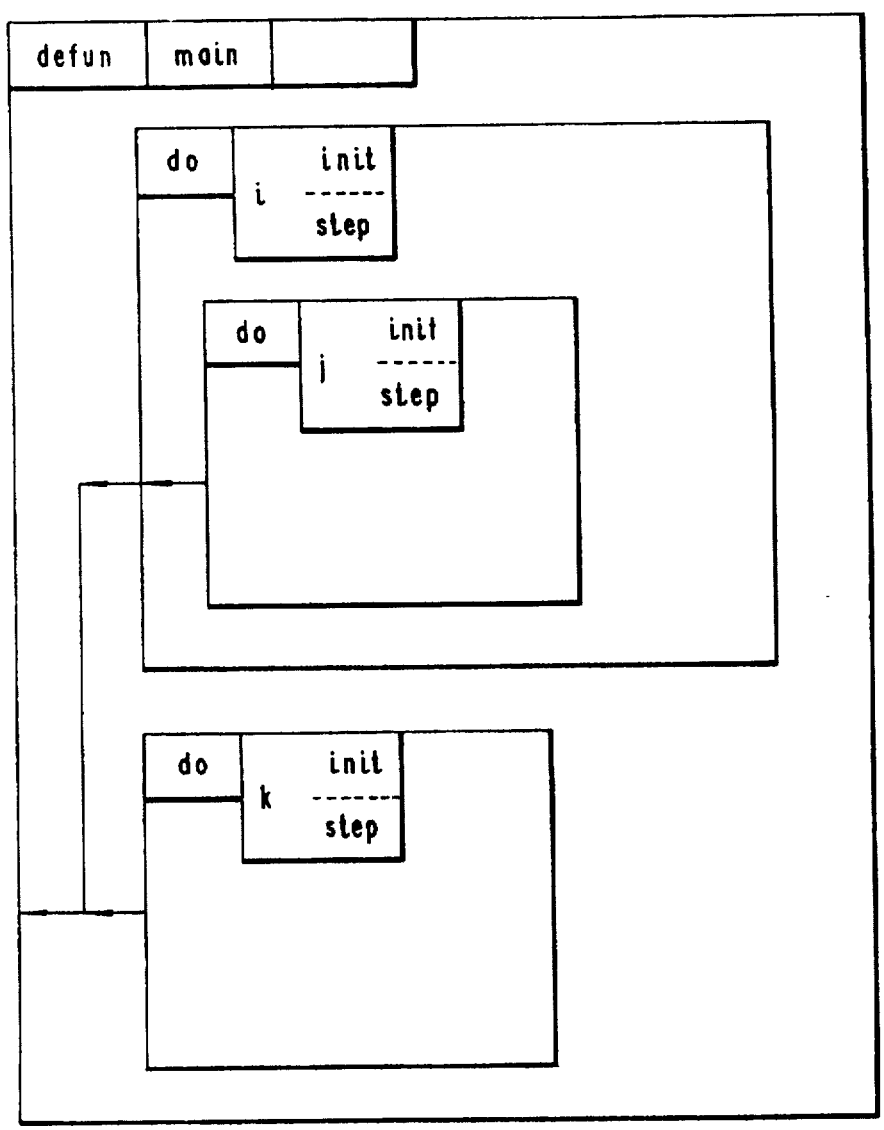

```
factorial (n)
int n ;
{
    int i, result ;
    result = 1 ;
    for ( i = 1 ; i < = n ; i+ + )
        result = i * result ;
    return (result) ;
}
```

FIG. 13a
```
FACTORIAL: PROCEDURE (N) RETURNS (FIXED BINARY);
    DECLARE N FIXED BINARY;
    BEGIN;
        DECLARE (I RESULT) FIXED BINARY;
        RESULT = 1;
        DO I = 1 TO N;
            RESULT = I * RESULT;
        END;
        RETURN (RESULT);
    END;
END;
```
FIG. 13b
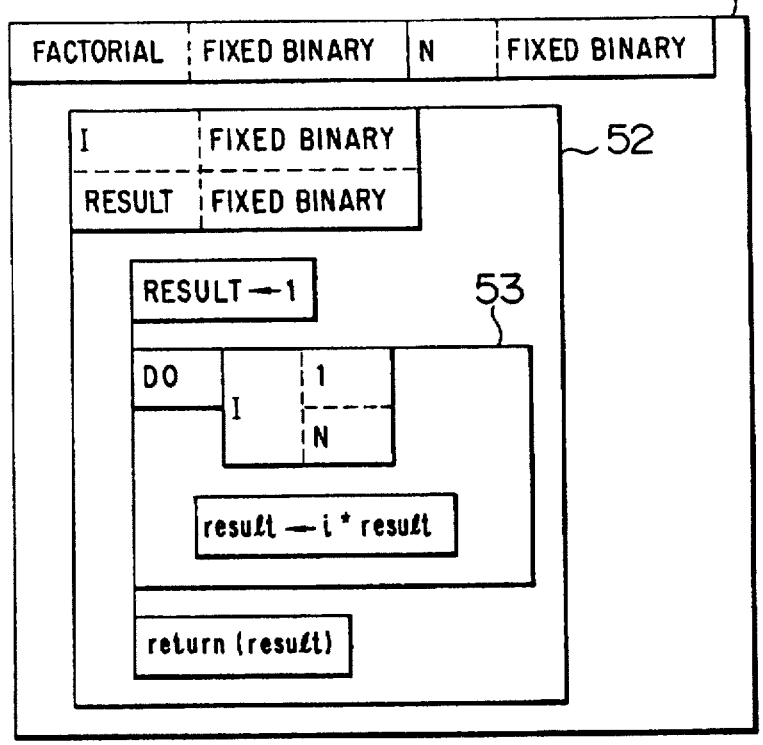
FIG. 14
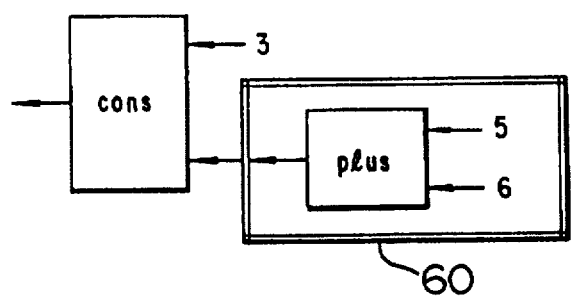

FIG. 15a

PROGRAMS TRANSFORMATION PROCESSING

| NO | ITEM | PROGRAMS EXPRESSED BY CHARACTERS | VISUALLY EXPRESSED | |
|---|---|---|---|---|
| 1 | ORDINARY FUNCTION | (⟨function name⟩⟨parameter 1⟩ ⟨parameter 2⟩ ⋯ ) | name — ⟨parm 1⟩, ⟨parm 2⟩ | FIG. 17 |
| 2 | FUNCTION DEFINITION (defun) | (defun ⟨function name⟩(⟨parameter 1⟩⋯) ⟨body⟩ ) | defun ⟨name⟩ ⟨parm 1⟩ ⟨parm2⟩ ⟨body⟩ | FIG. 20 |
| 3 | LOCAL VARIABLE DECLARATION (let) | (let ((⟨variable 1⟩⟨initial value 1⟩) (⟨variable 2⟩⟨initial value 2⟩) ⋯ ) ⟨body⟩ ) | let ⟨var1⟩ — ⟨init1⟩, ⟨var2⟩ — ⟨init2⟩, ⟨body⟩ | FIG. 18 |
| 4 | ITARATION (do) | (do ((⟨variable 1⟩⟨initial value 1⟩ ⟨step value 1⟩) (⟨variable 2⟩⟨initial value 2⟩ ⟨step value 2⟩) (⟨end-test⟩⟨result⟩) ⟨body⟩ )) | do ⟨var1⟩ init—⟨init1⟩ step—⟨step1⟩ ⟨var2⟩ init—⟨init2⟩ step—⟨step2⟩ ⟨end-test⟩ ⟨result⟩ ⟨body⟩ | FIG. 21 |
| 5 | map FUNCTION (mapcar) | (mapcar ⟨function⟩ ⟨list⟩ ) | mapcar ⟨function⟩ — ⟨list⟩ | FIG. 22 |

FIG. 15b  PROGRAMS TRANSFORMATION PROCESSING

| NO | ITEM | PROGRAMS EXPRESSED BY CHARACTERS | VISUALLY EXPRESSED | |
|---|---|---|---|---|
| 6 | SEQUENTIAL EXECUTION (progn) | ( progn ⟨process 1⟩ ··· ⟨process n⟩ ) | ⟨process 1⟩ ... ⟨process n⟩ | FIG. 19 |
| 7 | CONDITIONAL BRANCH (if) | ( if ⟨condition⟩⟨process 1⟩⟨process 2⟩ ) | ⟨condition⟩ → ⟨process 1⟩ / ⟨process 2⟩ | FIG. 23 |
| 8 | SUBSTITUTION (setq) | ( setq ⟨variable⟩ ⟨process⟩ ) | setq⟨variable⟩ ⟨process⟩ | FIG. 24 |
| 9 | QUOTE (quote) | (quote ⟨object⟩) or ˋ⟨object⟩  NOTE: (ˋ) INDICATES QUOTE | ⟨object⟩ | FIG. 25 |
| 10 | BACK-QUOTE | EXAMPLE: ʼ(list,(+xy),(*zw))  NOTE: (ʼ) INDICATES BACKQUOTE. | list → + → x,y ; * → z,w | FIG. 27 |
| 11 | SYMBOL | ⟨symbol name⟩ | ⟨symbol name⟩ | |
| 12 | DATA | EX.1 : NUMERAL VALUE 123  EX.2 : CHARACTER STRING "abc" | 123  "abc" | |

FIG. 26a   (quote ((a b) c (d (e f))))

F I G. 28
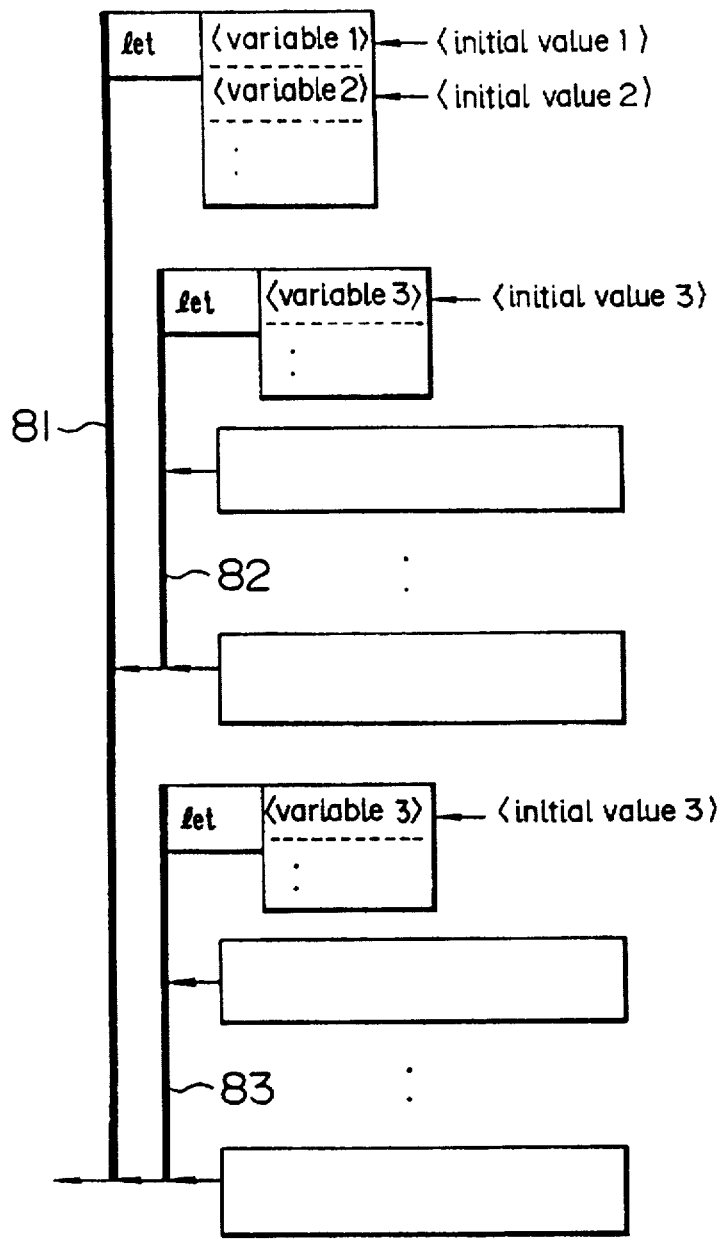

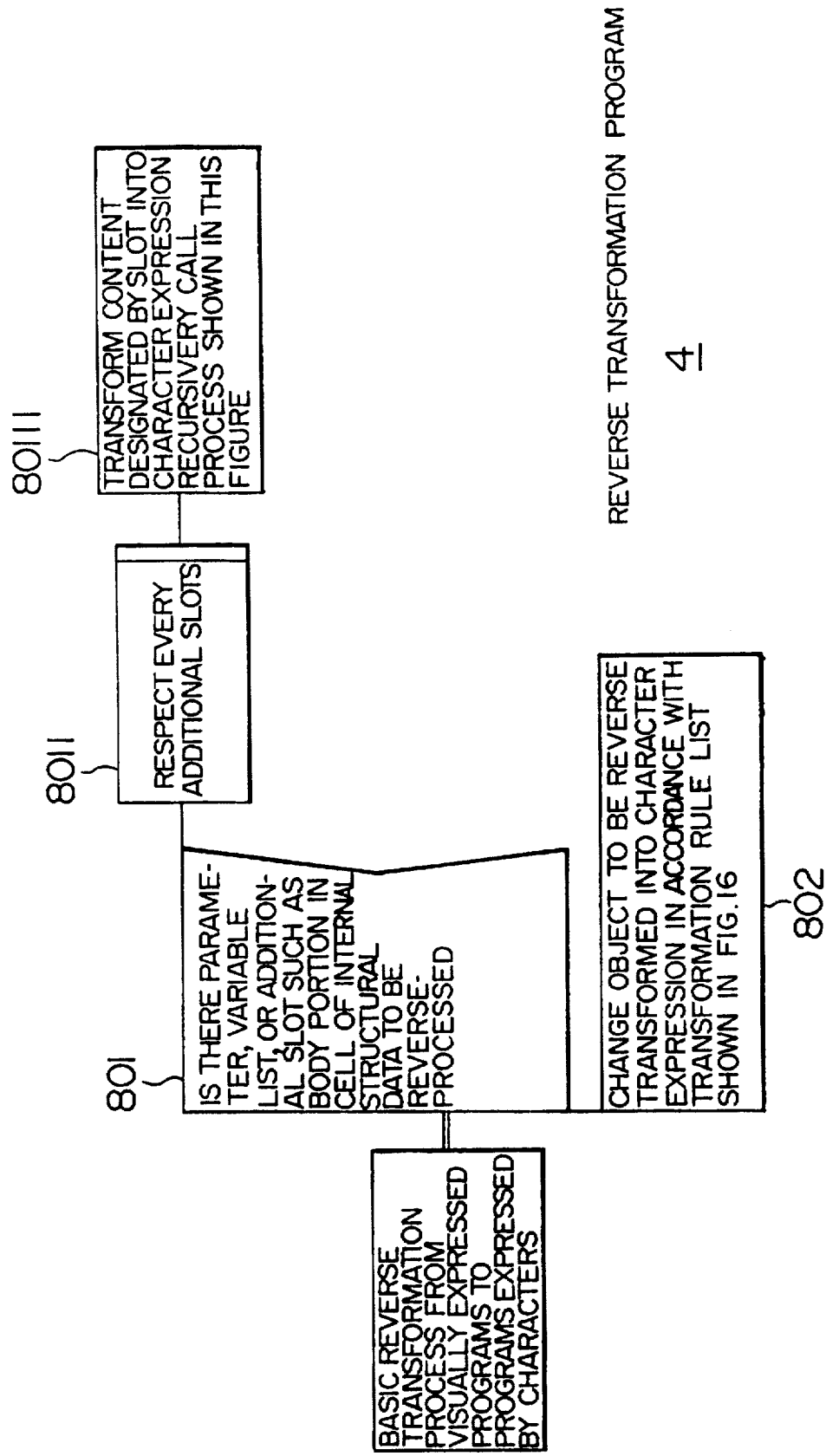

PROGRAM DISPLAY METHOD AND DEVICE, AND ALSO PROGRAM GENERATION METHOD AND DEVICE

This is a continuation application of application Ser. No. 08/410,580, filed Mar. 23, 1995, now abandoned, which is a continuation application of U.S. Ser. No. 07/665,563, filed Mar. 6, 1991, now abandoned.

BACKGROUND OF THE INVENTION

The present invention generally relates to a program display method and a device thereof, and also to a program generation method and a device thereof. More specifically, the present invention is directed to a method and an apparatus for visually expressing a processing content of a program, and also to a method and an apparatus for generating a program for visually displayed.

Very recently, various proposals have been actively made, by which programs are displayed visually.

In traditional program visual-expression methods, flowcharts are mainly utilized. Although such flowcharts can visually represent flows of processing operations, hierarchical control structures of programs cannot be correctly expressed by these flowcharts.

Currently, several program display methods with novel visual expressions have been proposed to solve the above-described problem. The systems for supporting visually expressing the programs are realized with employment of these conventional program display methods.

Some of these program visual-expressing methods are described in, for instance, the Japanese publication of NIKKEI COMPUTER "NOVEL EXPRESSION METHOD FOR PROGRAM CONTROL STRUCTURE: TREE STRUCTURE CHARTS ARE UNDER PRACTICAL USE" pages 71 to 83, 1989, Jan. 9; Leonard L. Trip "A survey of Graphical Nations for Program Design An Update", ACM SIGSOFT SOFTWARE ENGINEERING NOTES, pages 39 to 45, October 1988; and also Georg Reader "A Survey of Current Graphical Programming Techniques" Computer, pages 11 to 24, August, 1985.

Examples of program visual-expressing methods as described in the above publications will now be explained with reference to FIGS. 3a, 3b and 3c.

FIG. 3a represents a FORTRAN program containing iteration, conditional branch, and sequential executions.

FIG. 3b represents so-called "PAD" (cf. Y. Futamura, T. Kawai, H. Hirokoshi and M. Tsutsumi "Development of Computer Program by Problem Analysis (PAD)", Proc. 5th International Conference on Software Engineering, pages 325 to 332, 1981), in which the control structure of the program shown in FIG. 3a is visually displayed with a tree structure layout.

In this PAD display method, the control structure of the program is expressed by entering a unit process into a box and combining the boxes with lines. To a specific process box, a shape indicative of this box is attached. For instance, the shape of the box for the "iteration" processing corresponds to such a shape, as represented by reference numeral 31 of FIG. 3b, which shows a vertical line made at a right edge of the box. The character string in the box represents that "I" is varied from 1 to 5, and the processing operation "A(I)=B(I)+C(I)" in the box connected at the right hand thereof is iteratively executed. Further, as shown by reference numeral 32 of FIG. 3b, the shape of the box for the "conditional branch" corresponds to a box figure which is indented at a right side thereof. The character string within the box represents that if the condition "X>Y" is satisfied, the processing operation "Z=X" of the box connected to the upper edge of the box 32 is executed, whereas if the condition is not satisfied, the processing operation "Z=Y" connected to the lower edge of the box 32 is executed. Also, connecting the left edges of the boxes 31 and 32 by the vertical line enables the processing operation of "sequential execution" to be displayed, in which the processing operations as defined in the boxes 31 and 32 are successively executed from the upper box. It should be noted that control structures of the programs other than the "iteration", "conditional branch", and "sequential execution" are displayed by characters in the boxes.

FIG. 3c represents a so-called "NS chart" in which the control structure of the program shown in FIGS. 3a is displayed by visual expression having nested structure.

Also, in this display method, the control structures other than three control structures of "iteration", "conditional branch" and "sequential execution" are displayed in the boxes by way of the character expressions.

These program visual-expressing methods are achieved in accordance with the basic idea of structured programming, and therefore seek to visualize the program control structures in the procedural programming languages such as FORTRAN, PL/I, PASCAL and C languages.

In the recent programming languages such as PL/I, PASCAL, Ada, and C languages, there are prepared as language constructs for describing programs structurally so-called "block structures" such as internal subroutines, internal functions and constructs for introducing local variables within a program, other than the above-described three control structures.

FIG. 4 represents an example of the LISP program described with employment of the block structure. The form defined by line number 2 of "flet" shown in FIG. 4 corresponds to a form for defining a local function. The line numbers 2 to 4 indicate definition descriptions of the local function "fun1". These line numbers define such functions for returning a summation of parameters "a" and "b". The local function "fun1" is effective within a scope (line number 2 to line number 12) occupied by the form "flet", namely the local function may be called from this scope so as to be utilized. The function definition portion (line number 2 to line number 4) and the portion (line number 2 to line number 12) in which the function "fun1" is effective constitute blocks respectively.

The line numbers 5 to 11 correspond to the block which has been defined by the form "let" for introducing the local variables. In this case, the local variable "c" has been conducted. The line numbers 6 to 10 under the above-described block represent the scope occupied by the line number 5 of "let" and the variable "c" is effective within this scope.

In the line numbers 7 to 9, there is the block defined by another form "let" for introducing the local variable. This block has the nested relationship with the block defined by the form "let" outside this form. Although the variable having the same name as that of the above variable has been introduced, both of the blocks represent different variables. The effective scope for the variable "c" introduced by the line number 7 is defined from the line number 7 to the line number 9, whereas the variable "c" introduced by the line number 5 outside this scope becomes effective. Accordingly, the calculation result given by the line number 6 is outputted in the output statement of the line number 10.

In summary, the block implies that a plurality of statements are combined to establish a single statement and also is the partial structure of a program having a function for localizing the effective scope of names (names of variable, function and subroutine, and also destination labels such as the "goto" statement) declared in the blocks in order of assignments of the names to the variables which have been declared therein. There is the block for defining the subprogram such as the function and subroutine, and also the block for merely combining the portions of programs to introduce the local variables. As an example of the latter-mentioned block, there are the BEGIN block of PL/I, the block defined by the LISP of "let", and the block surrounded by an open brace ({) and a close brace (}) of the C language.

It is also possible to form a multiply nested structure with employment of a plurality of blocks. As a consequence, the program with the hierarchical structure in a good module form may be described by combining the plural blocks with each other.

As another example of the program visual-expressing method, a description will now be made of the methods for visually displaying the programs described in the functional language such as the LISP language with reference to FIGS. 5a, 5b and 5c.

FIG. 5a represents a LISP program.

FIG. 5b illustrates that the calling relation for the function of the program shown in FIG. 5a is expressed in a tree structure. In this figure, the function corresponding to the language element is expressed by the box, and the name of this function is written within this box. Connecting these boxes by arrows enables the input/output relationship among the respective functions to be expressed. This example is the conventional display method as described in the publication Levien R, "Visual Programming" Byte, pages 135 to 144, Feb. 1986.

FIG. 5c illustrates that the same program as that of FIG. 5a is visually displayed in accordance with the nested structure. In FIG. 5c, each of the closed figures corresponds to each of these functions, the shape of which represents a function of the relevant function. This conventional example is known from the publication, Chang, S.-K., Ichikawa, T. and Ligomenides, P. A. "Visual Languages" Plenum Press, 1986, page 52.

In accordance with the LISP program, as represented in FIG. 5a, a program is described in a so-termed "list" with employment of parenthesises (this "list" implies that a list of elements is surrounded by parathesises, the element may function as the list). However, there are some situations that the list is not handled as the program but as the data. Therefore, to discriminate between data and program in the LISP, the special function referred to as the "quote" has been prepared. It implies that a list in which this "quote" is positioned at a head portion thereof is not executed as a program, but is handled as data. It should be noted that in accordance with the terminology of the LISP language, executing a program implies that the program is "evaluated". Also, an operation in which the special function "quote" is attached to a head portion of a list and this list with the special function being handled as data, is understood to be "quoted". As a consequence, the special function "quote" corresponds to a quote instruction.

In FIG. 6a, there is shown an example of the program with employment of the special function "quote". FIG. 6b represents that the program shown in FIG. 6a is visually expressed by way of the display method shown in FIG. 5b.

The program display methods such as the above-described PAD and NS chart do not have the visual expression of the block structure. Therefore, the hierarchical program with a block structure as shown in FIG. 4 cannot be correctly displayed by the visual expression. There are further problems in the visual expressions for the three control structures such as the "iteration", "conditional branch" and "sequential execution".

For instance, the following problems are present in the iterative representation of the above-described PAD.

As represented in FIG. 3b, the iterative control portion is described in the box by the characters in the above-described PAD. However, since the iterative control portions of the C language and Common LISP language may be arbitrarily described, there are some cases that the contents of these control portions become complex. In this case, if such complex contents are completely written into the iterative boxes by the characters, the character representations become cumbersome and unrecognizable.

Furthermore, since the iteration descriptions contain only the boxes at the head portions (left ends) of the tree structures and the control descriptions made therein, there is another problem that the scope of control by the iteration can be hardly recognized.

On the other hand, even in the conventional display method shown in FIG. 5b, as apparent from FIG. 6b, since the portion to be handled as the data (i.e., the portion of "(plus 5 6)" in FIG. 6a) is also expressed by the same expression as the function, there is another problem that the list to be handled as data cannot be clearly discriminated from the list to be handled as program.

As previously described, according to the program display methods of the conventional visual expressions, there is a further problem that the partial structures (block structures, iteration, and lists to be handled as the data) of the programs with expansion cannot be correctly displayed.

SUMMARY OF THE INVENTION

Therefore, an object of the present invention is to provide a method and an apparatus for easily displaying programs in visual expressions, containing also partial structures of the programs with domain, whereby the programs may be readily and visually recognized.

A further object of the present invention is to provide a method and an apparatus for generating programs (source program, or instruction sequence by machine language) expressed by characters from programs obtained by inputting and editing a series of processing operation with employment of the visual expression according to the present invention.

In accordance with the present invention, a program expressed by characters is analyzed; partial structures of a lump of programs are extracted; figures each having a domain is assigned to each of the partial structures; both an effective scope of variables used therein, and discrimination between the program and data are expressed by the domain; and also relationships of inclusion among the partial structures corresponding to the figures are expressed by overlapping within a domain of one figure, another figure.

Under the above-described arrangement, when one partial structure refers to another partial structure, it is desirable to arbitrarily select either displaying the figure indicative of the reference effected by another partial structure, or displaying the figure corresponding to another partial structure which is replaced by this figure.

Furthermore, according to the present invention, such a visual representation is analyzed so that a plurality of figures each having a domain are overlapped with each other and an arrow is attached to each of the figures; a lump of program partial structures are extracted from the respective figures; an inclusive relationship of the partial structures is extracted from the overlapping condition of these figures; both an effective scope of variables used inside the partial structures and discrimination between the program and data are extracted from the domains of the respective figures; and also a program expressed by characters is produced from the partial structures of these programs and the inclusive relationships among them.

BRIEF DESCRIPTION OF THE DRAWINGS

FIG. 3a represents an example for denoting a FORTRAN program;

FIG. 3b represents an example for indicating the FORTRAN program shown in FIG. 3a by way of the conventional PAD;

FIG. 3c represents an example for indicating the FORTRAN program shown in FIG. 3a by way of the conventional NS chart;

FIG. 5a illustrates an example of a LISP program;

FIG. 5b represents an example for indicating the LISP program shown in FIG. 5a by way of the conventional program display method;

FIG. 5c indicates an example for showing the LISP program of FIG. 5a by way of the conventional program display method;

FIG. 11 represents an example indicated by the program display method according to the present invention;

FIG. 13a represents an example for showing a program by way of the PL/1;

FIG. 13b illustrates an example for showing the program of FIG. 13a by way of the program display method according to the present invention;

FIG. 14 represents an example for denoting the LISP program shown in FIG. 6a by way of the program display method according to the present invention;

FIGS. 15a and 15b are lists of transformation rules employed in the program display method and program generation method according to the present invention;

FIG. 26a represents an example of a list for showing data;

FIG. 28 is an illustration of a graphic representation by a program display method according to another preferred embodiment of the present invention;

FIG. 30 is a PAD diagram of a basic process for a reverse transformation program shown in FIG. 1;

FIG. 31b is an example of a figure representation the content of which is referred to; and, FIG. 31c is a diagram of a display condition in which the reference content shown in FIG. 31b has been embedded in the referring portion shown in FIG. 31a.

DESCRIPTION OF THE PREFERRED EMBODIMENTS

The present invention will now be described more in detail with employment of various preferred embodiments. It should be noted that the present invention is not limited thereto.

Figure 7:
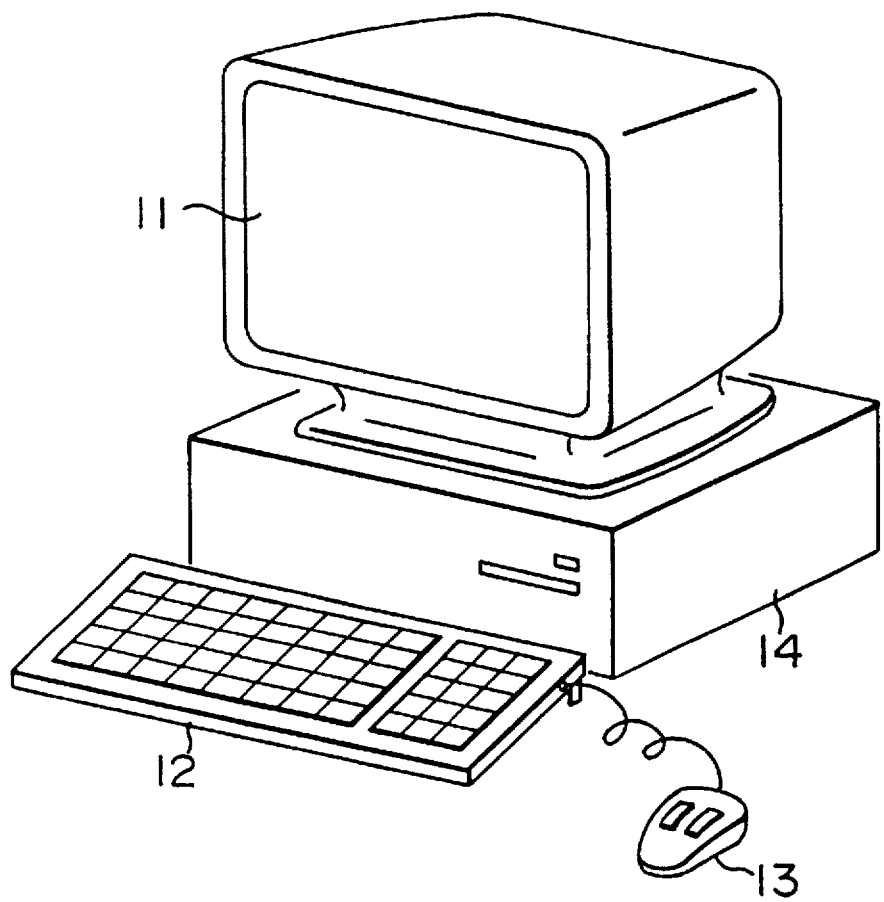
FIG. 7 is a perspective view of an apparatus for embodying both the program display method according to the present invention and the program generation method according to the present invention.

In FIG. 7, there is shown a program display apparatus capable of realizing a program display method according to the present invention.

Reference numeral 11 indicates a display having either two-dimensional, or three-dimensional graphic representing capabilities. A program is displayed on a screen of this display in a graphic representation.

Reference numeral 12 denotes a keyboard for entering characters and also various instructions for the program display apparatus.

Reference numeral 13 represents a pointing device such as a mouse for performing a position instruction and the like on the screen of the display 11.

Reference numeral 14 indicates a computer apparatus for a personal computer, a work-station and so on, which includes a central processing unit, so-called as a "CPU", a main memory, and a display controller for display figures and characters on the above-described display 11. Also, this computer apparatus further includes secondary storage devices such as a hard disk and a floppy disk, if required. In the main memory, there have been stored various programs for executing the program display method according to the present invention. Also, a program and data expressed by characters to be represented in a visual mode.

Figures 2A, 2B:
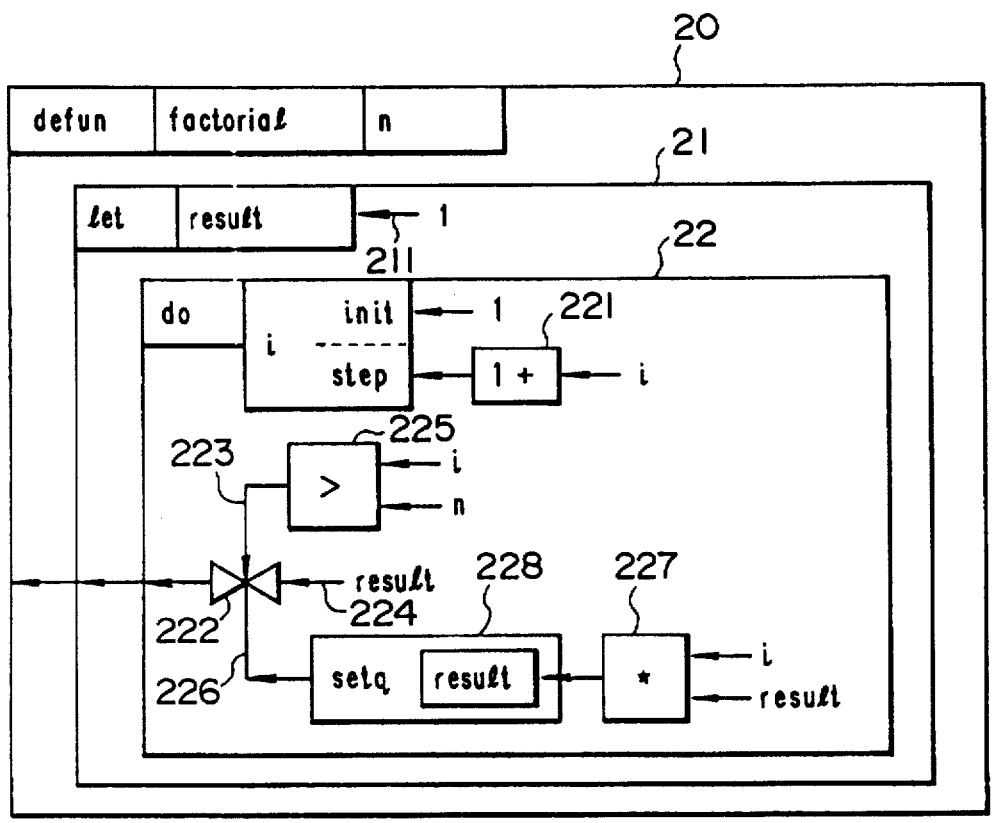
FIG. 2a illustrates an example of a LISP program.
FIG. 2b illustrates an example of the LISP program shown in FIG. 2a which has been represented by the program display method of the present invention.

FIG. 2a represents a program of a factorial function expressed by the LISP language. An operation of the factorial function program is as follows.

When this program is called, a concrete numerical value is given to a parameter "n" (a first line in FIG. 2a), a local variable "result" is first initialized to be "1" (a second line in FIG. 2a). Next, "i" is changed from "1" to "n" incrementally (at third and fourth lines), and each "i" is multiplied by "result", whereby a resultant value is substituted or replaced by "result" (at a fifth line). When "i" becomes greater than " n", the do loop is completed and the value "result" is returned (at a fourth line). That is to say, the result obtained by multiplying the numeral values 1 to "n" with each other is returned. It should be noted that "defun" and "let" shown in FIG. 2a represent descriptive element for indicating a block structure.

FIG. 2b represents an example for showing the LISP program of FIG. 2a in a visual expression according to the program display method of the present invention.

In FIG. 2b, reference numeral 20 indicates a frame representative of definition for the factorial function. At an upper edge of this frame 20, there are shown a keyword "defun" indicative of the function definition, a keyword "factorial" indicative of the name of function to be defined, and a keyword indicative of the parameter "n".

There is a body of the function definition within the frame 20. In other words, a frame 21 representative of declaration of a local variable "let" and a portion surrounded by it correspond to the body of the function definition.

Similarly, there are shown a keyword "let" indicative of the local variable definition and a keyword "result" indicative of the local variable defined therein, which are written within the corresponding boxes at the upper edge of a frame 21.

It is shown that when the frame 21 of the declaration of local variable "let" gains control, an initial value "1" is given to the local variable "result" from an arrow 211 indicating the box of the local variable "result" from the right direction and a numeral value "1" of a right edge thereof.

Within the frame 21, there is a frame 22 indicative of an iterative control structure "do". There are boxes into which a keyword "do" and an iterative control variable "i" have been entered at an upper edge of the frame 22, that is similar to the above-described frames 20 and 21.

The iterative control variable must normally designate both an initial value and update values after second time, which are indicated by a keyword "init" and another keyword "step" arranged at the right sides of the box for indicating the control variable "i". A numeral value "1" given via an arrow to the keyword "init" implies an actual initial value. To the keyword "step" indicative of the update values after second time, actual update values after second time are given from a box 221 coupled to an arrow in a left direction.

The box 221 corresponds to a visual expression indicative of a function. Generally speaking, based upon values of parameters which are entered at a right side of a box for the function, an operation corresponding to the keyword indicated in the box is carried out, and a calculation result is transferred to a component indicated by the arrow originated from the left side of the box. In case of the box 221, "1" is added to the parameter "i" (operation corresponding to the keyword (1+)), and a resultant value thereof is given to the control variable "i" so as to update the control variable. The box 221 and parameter correspond to the function expression (1+ i) written at the third line of FIG. 2a.

A FIG. 222 made by positioning summits of two triangles opposite to each other within the frame 22 represents an end-test portion of the iterative control structure "do".

An arrow 223 coming upwardly into the FIG. 222 represents a condition of the end-test. When the value indicated by this arrow 223 is any value other than "nil" (symbol "nil" indicates logical false with respect to the LISP language field), the end condition is satisfied so that the portion connected to the arrow 224 which enters into the FIG. 222 from a right direction (local variable "result") is evaluated, and then is outputted as a value of the iterative control structure "do" via an arrow projected from the left direction. When a value indicated by the arrow 223 corresponds to "nil", the end condition is not satisfied, so that a process coupled to a line segment 226 extending downwardly to the FIG. 222, namely a body of the iterative process is executed.

A box 225 corresponds to a function indicative of an end condition. In this example, when the variable "i" is compared with the variable "n" and "i" is greater than "n", a value "t" (symbol "t" indicates logical true in the LISP language field) is outputted. Conversely, if "i" is not greater than "n", "nil" is outputted.

Boxes 227 and 228 correspond to bodies of iterative processes. In this example, the variable "i" is multiplied by the variable "result" (namely, by a function "*" indicated by the box 227), and then a resultant value thereof is substituted for the variable "result" (i.e., by a special function "setq" of the LISP language indicated by the box 228).

As previously described, in accordance with the program display method and apparatus according to the visual expression of the present invention, the LISP program shown in FIG. 2a may be expressed in the visual expression as shown in FIG. 2b.

As shown in the drawings, since both the block structure and iterative structure of the program are represented by the frames, it may be readily understood that the ranges occupied by these structures are grasped. Also, the effective scopes of the parameters for the function definition, the local variables, and the control variables for the iterative control structure can be readily grasped.

Figures 4, 6A, 6B:
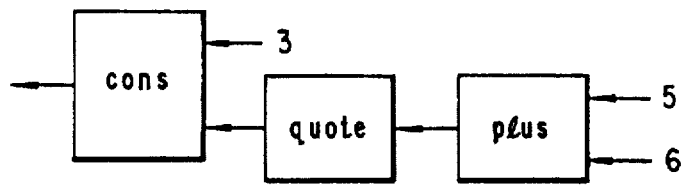
FIG. 4 illustrates an example of a LISP program.
FIG. 6a illustrates an example for representing another LISP program.
FIG. 6b represents an example for showing the LISP program by way of the conventional program display method.
Figure 8:
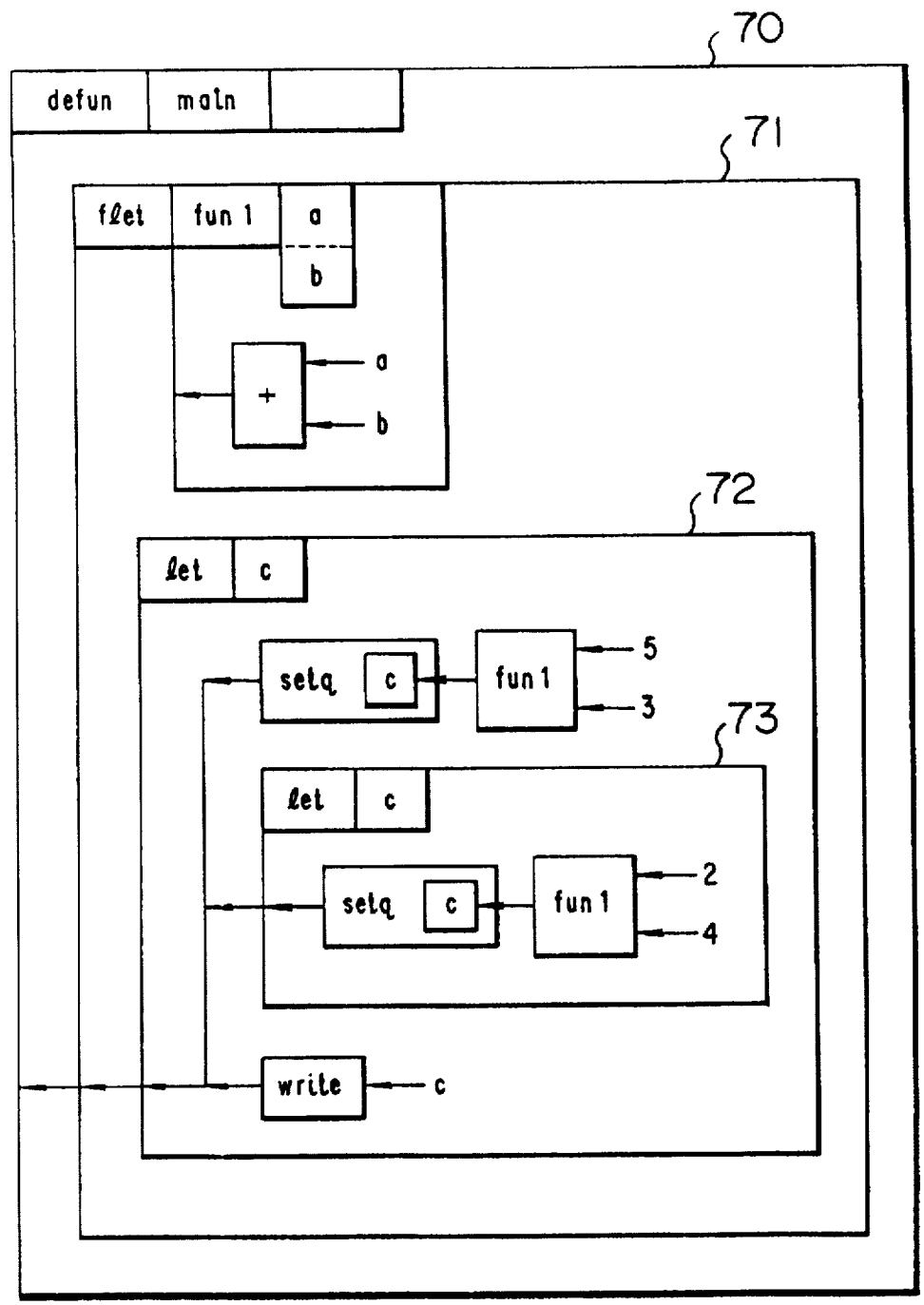
FIGS. 8 and 9 illustrate examples for representing the program display method according to the present invention.

Then, another example according to the program display method of the present invention is represented in FIG. 8. FIG. 8 corresponds to such an example where the LISP program shown in FIG. 4 is visually expressed according to the program display method of the present invention.

The present example is mainly arranged by a block for function definition positioned at the outermost (reference numeral 70 shown in FIG. 8), a block for local function definition (reference numeral 71), and two blocks indicated by reference numerals 72 and 73 for introducing local variables. Since these blocks are denoted by frames, ranges occupied by these frames and effective scopes for various identifiers (variable/function names) belonging thereto may be readily seen. In particular, a difference between the scope where the variable "c" introduced by the frame 72 in the corresponding block becomes effective, and the scope where the variable "c" introduced by the frame 73 becomes effective, may be easily understood at first glance.

Further examples will now be described.

Figure 9:
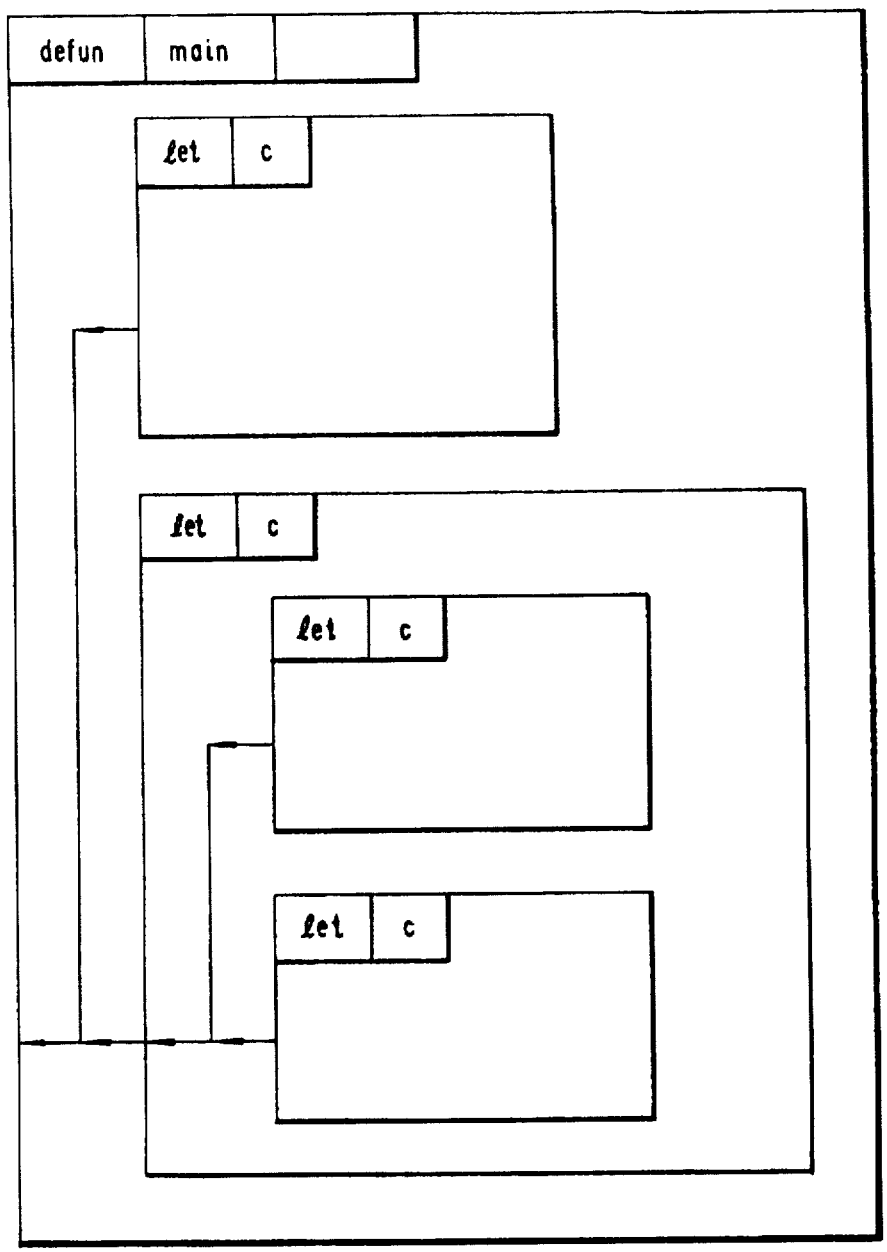

FIG. 9 represents an example of a program consisting of four blocks of variable introducing forms "let". Although all of the local variables introduced by the respective forms "let" are set to "c", each scope may be clearly grasped. Also, the parallel relationships and hierarchical relationships among the blocks by the introducing forms "let" may be readily understood.

Figures 10A, 10B:
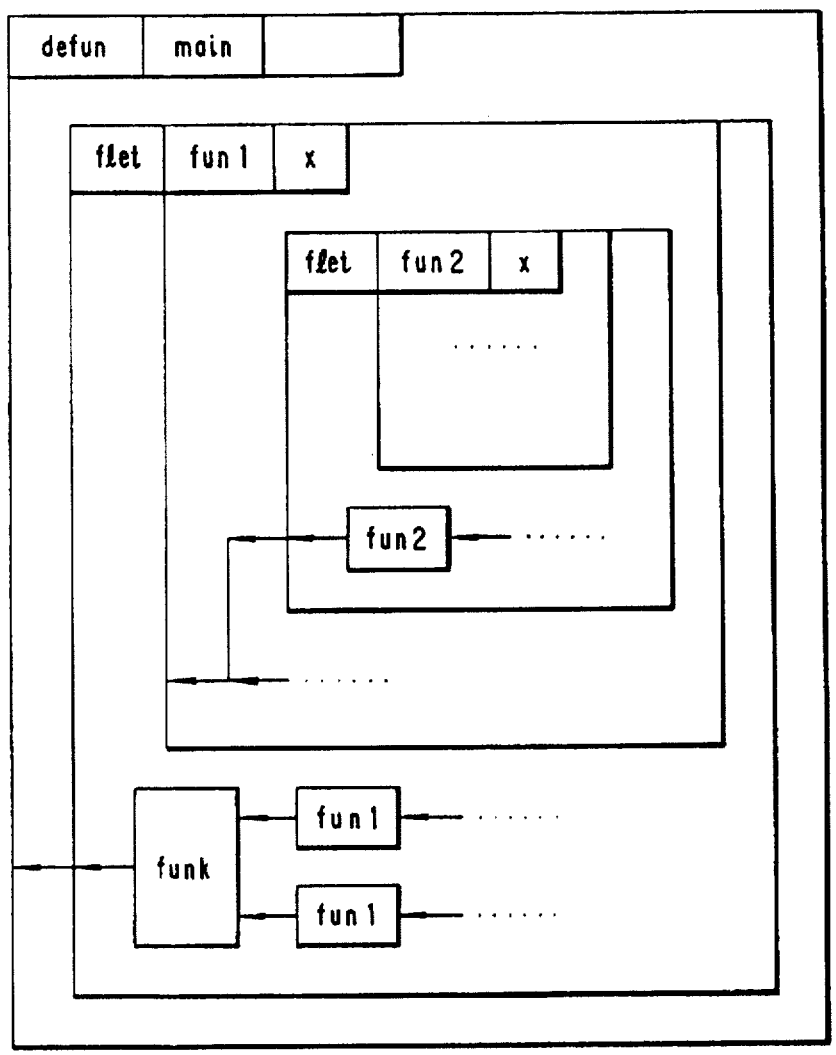
FIG. 10a represents an example for showing a LISP program.
FIG. 10b indicates an example for showing the LISP program of FIG. 10a by way of the program display method according to the present invention.

FIG. 10a represents another program example in which local functions are defined in a nested order. FIG. 10b illustrates a visual expression. In this example, a local function "fun2" is further defined in the definition of the local function "fun1". This may be expressed by the frame, whereby the hierarchical relationship between the blocks for the local function definition may be readily understood.

FIG. 11 illustrates another program example in which iterative forms have been utilized in a multiple form. This program example also has the advantage that the range of iterative controls, the scope of control variables thereof, and also the iterative structure relationship may be expressed by the frames, which is similar to that of the above-described "let" case.

As shown in the program examples, since the block structures and the iterative structures are expressed by the frames, it may be easily understood that the ranges occupied by these structures, the scope of the names for the relevant variables and functions, and also the hierarchical relationships among these partial structures may be clearly recognized.

In lists shown in FIGS. 15a and 15b, there are corresponding relationships between the individual program language elements employed in LISP language programs and corresponding visual expressions. A detailed description on these items will be made later.

Although the programs expressed by the LISP language and the visual expressions thereof have been utilized in the above-mentioned descriptions, other programming languages may be utilized so as to achieve the similar expressions including the C language and PL/I (programming language/I).

Figures 12A, 12B:
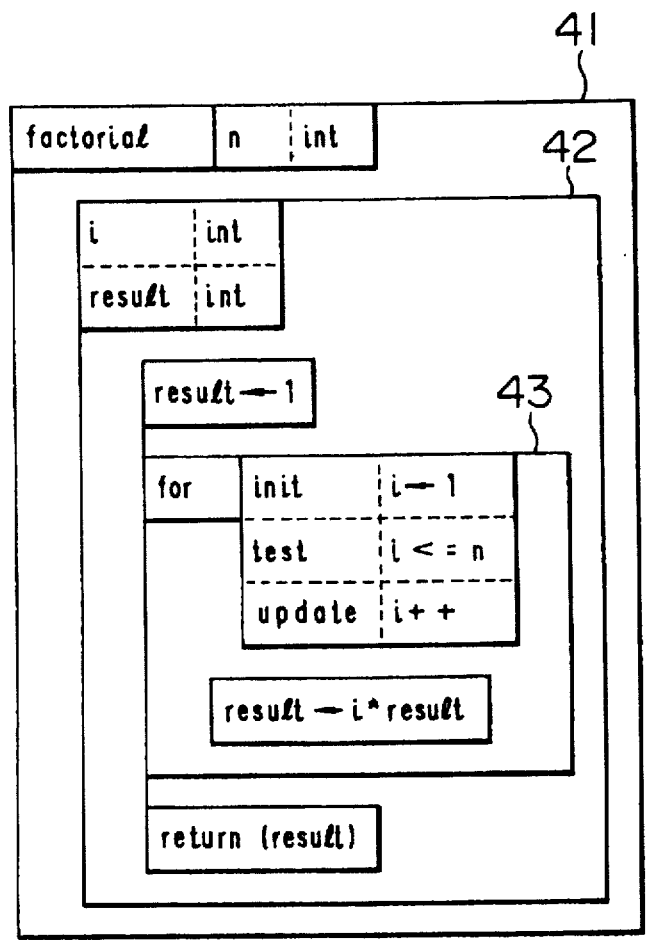
FIG. 12a illustrates an example for showing a program by "C"
FIG. 12b illustrates an example for representing the program of FIG. 12a by way of the program display method according to the present invention.

FIG. 12a represents a program of a factorial function expressed by the programming language "C". FIG. 12b indicates an example expressed by the program display method according to the present invention.

FIG. 13a illustrates a program of a factorial function expressed by the programming language PL/I. FIG. 13b illustrates the factorial function program of FIG. 13a, expressed by the program display method according to the present invention.

Also in FIGS. 12b and 13b, the function definition, the block structures for declaration of local variables, and the iterative control structures have been expressed by the frames (reference numerals 41, 42 and 43 shown in FIG. 12b and reference numerals 51, 52 and 53 shown in FIG. 13b), so that both the block structures and the ranges for managing the iterative controls may be readily understood. Also, the scopes for the parameters of function definition, the local variables, and the iterative control variables may be easily understood.

FIG. 14 is an illustration in which the LISP program shown in FIG. 6a is visually displayed by way of the program display method according to the present invention.

Since the special function "quote" used for writing the list as the data is visually expressed by a dual-line frame 60, discrimination between the program part and the data part which could not be clarified in the conventional visual expression shown in FIG. 6b, may be clearly achieved.

Then, concrete contents of the program display method and program display apparatus according to the present invention will now be described. It should be noted that the present preferred embodiment discloses an overall visualization process of a program containing both the program display and generation methods according to the present invention.

Figure 1:
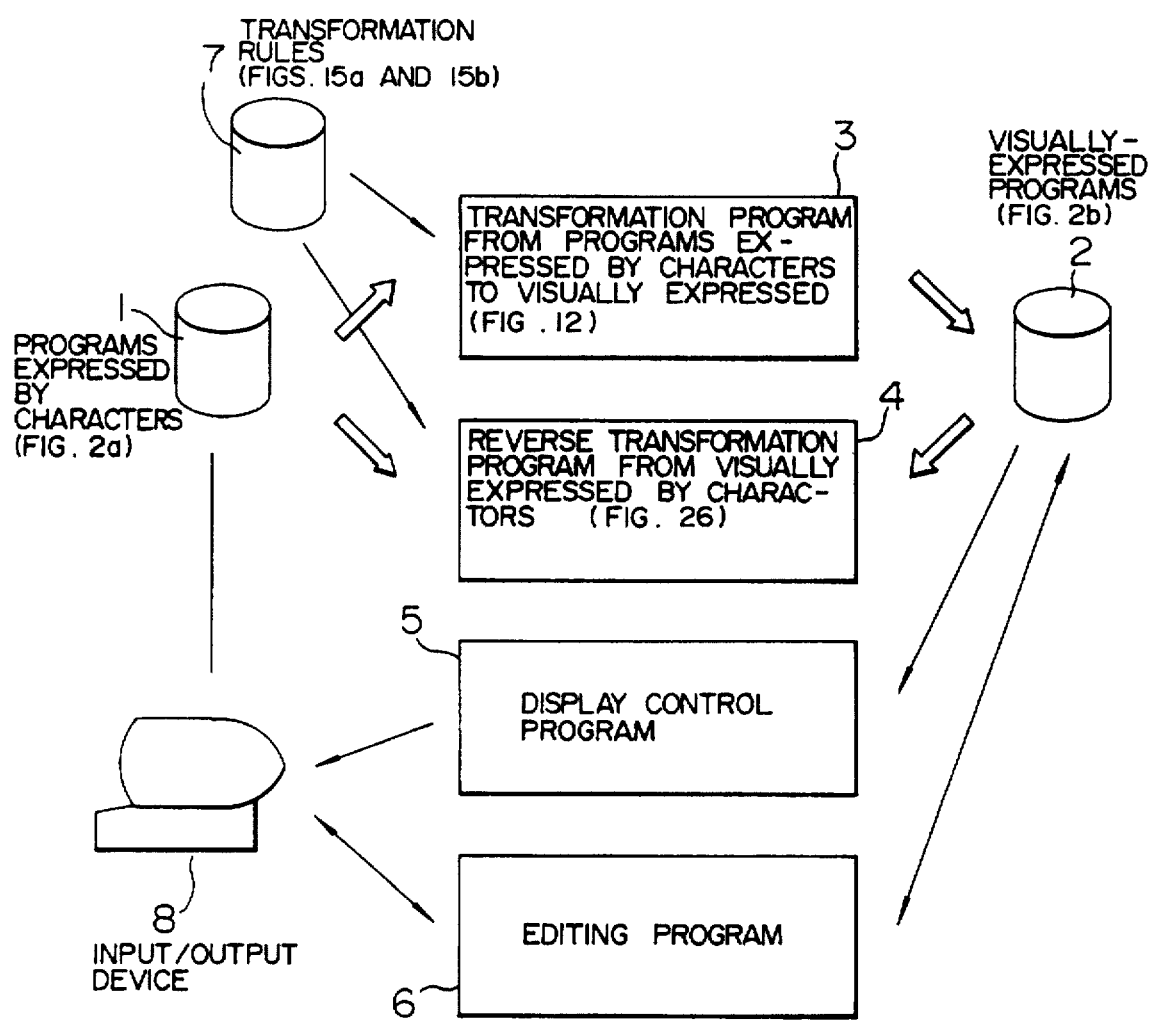
FIG. 1 is a schematic block diagram for showing a program display method and a program generation method according to one preferred embodiment of the present invention.

FIG. 1 is a schematic block diagram for showing a process for the program display method according to the present invention.

In FIG. 1, reference numeral 1 indicates a program expressed by characters as shown in FIG. 2a. Reference numeral 2 represents a visually-expressed program as shown in FIG. 2b.

Reference numeral 7 denotes transformation rules for transforming the program expressed by characters into the corresponding visual expression. They contain the transformation rules for transforming instruction sequences for giving partial structures of programs expressed by characters, such as block structures for a main program, a subprogram, and a compound statement consisting of a series of execution statements with declarations of local variables, and iterative structures indicating a range of iterative control and a scope of variables used within the iterative control, and also a group of data series designated by a description of data specification such as quote instructions, into the corresponding visual expressions. In case of the LISP language, for instance, the list of transformation rules is shown in FIGS. 15a and 15b.

Reference numeral 3 of FIG. 1 represents a transformation program for transforming the program 1 expressed by characters into the visual expression thereof with reference to the above-described transformation rule 7.

Reference numeral 4 denotes a reverse transformation program for generating the program 1 expressed by characters from the program 2 visually expressed.

Reference numeral 5 represents a display control program for fetching the visually expressed program 2 so as to be transferred to an input/output device 8 for display purpose, and also for controlling a display method thereof.

Reference numeral 6 indicates an editing program for correcting via the input/output device 8 the visually-expressed program 2, and also for newly inputting the visually-expressed program 2.

Figure 16:
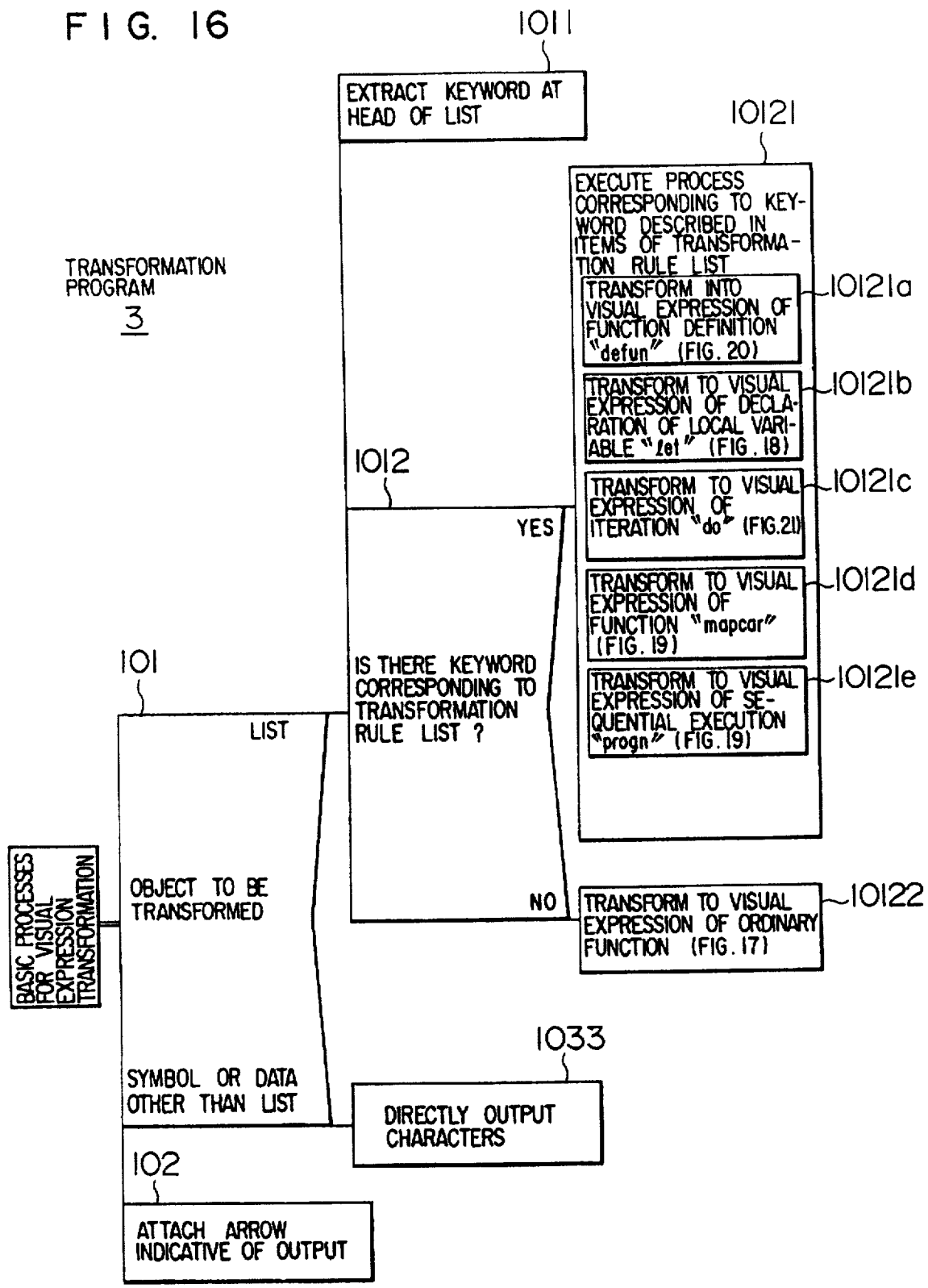
FIG. 16 is a PAD diagram of a basic process for the transformation program shown in FIG. 1.

In FIG. 16, there is shown a basic processing flow of a transformation program 3. In this drawing, to indicate the flow of processing, an expression by PAD is utilized. Also, a LISP program is assumed as the program 1 expressed by characters.

At a step 101, the given LISP program is analyzed to pick up an object under transformation (i.e., either an instruction sequence or a group of data series to give a partial structure of a program), and a decision is made whether or not the picked object corresponds to a list, or data other than a symbol or a list. As previously stated, this list implies a plurality of list of elements surrounded by a left parenthesis and a right parenthesis. This symbol implies a character sequence or series consisting of normally more than one list of characters, which is employed so as to represent a name of variable. The data other than the list implies a numeral value, a character or character series as data, a vector and an array. In accordance with the Common LISP language, exclusive expression methods are given to the data.

If a judgement is made that the object to be transformed corresponds to the list at the step 101, the process is advanced to a step 1011. If it is judged that the object to be transformed corresponds to either the symbol or the data other than the list, the process is advanced to a step 1033.

At the step 1011, a keyword positioned at a head of the list is extracted (normally, an element of a list head corresponds to a keyword representative of a title of function and the like).

At a step 1012, a check is made whether or not this keyword is present in the above-described transformation rules 7.

If there is such a keyword, since it is required to be transformed into a specific visual expression, the process is advanced to a step 10121 in which the transformation into the specific visual expression is carried out in accordance with the content of the transformation rules 7. Each content of these processings will be described with reference to FIGS. 18 to 25 in detail.

Conversely, if there is no keyword, the process is advanced to a step 10122 at which a transformation into a visual expression of an ordinary function is carried out in response to the content of the transformation rule list 7. Similarly, a content of this processing will be discussed with reference to FIG. 17.

An example of the visual expression as an ordinary function is represented as an item number 1 in the transformation list shown in FIG. 15a. Examples of the special visual expressions are indicated as item numbers 2 to 10 in the transformation list shown in FIGS. 15a and 15b.

At the step 1033, the object to be transformed (symbol or data other than list) is directly outputted (in the form of characters). This example is represented as item numbers 11 and 12 in the transformation list shown in FIG. 15b.

Finally, an arrow indicative of the output is attached at a step 102.

Figure 17:
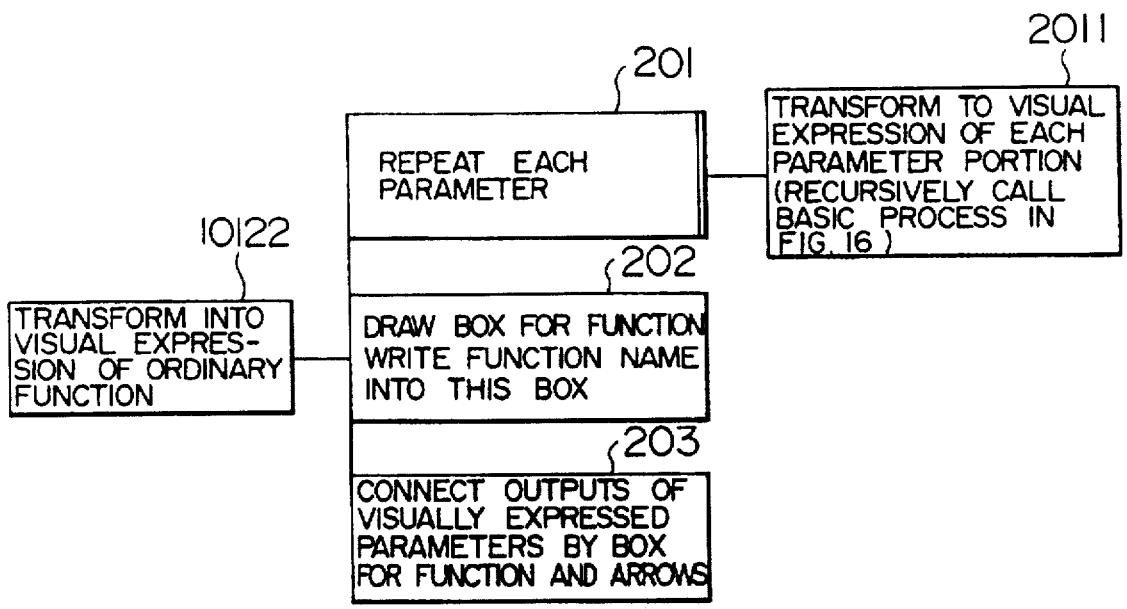
FIG. 17 is a PAD diagram of a basic process for a step 10122 shown in FIG. 16.

Referring now to FIG. 17, the processing operation defined at the above-described step 10122 will be described more in detail.

First of all, at steps 201 and 2011, the parameter portions of the function ("parameter1", "parameter2", . . . ) are transformed into visual expressions. Since the processing operations of the respective parameters, namely the processing operation at the step 2011 are identical to the basic processing operations of FIG. 16, the basic processing operation of FIG. 16 is recursively called to be executed.

Next, at a step 202, a box for visually expressing a function is drawn into which a title of the function is written.

Then, at a step 203, the outputs of the respective visually expressed parameters are connected to the box by arrows.

Subsequently, the processing operation defined at the step 10121 of FIG. 16 will now be explained more in detail with reference to FIGS. 18 to 25.

Figure 18:
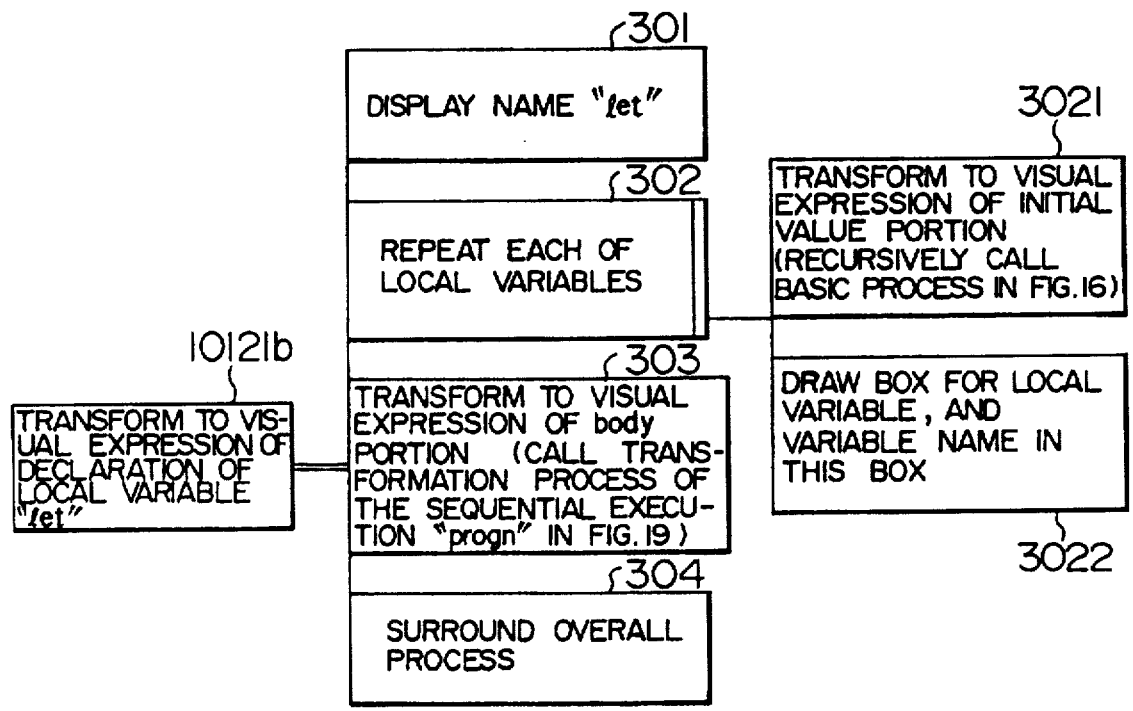
FIG. 18 is a PAD diagram of a basic process for a step 10121b shown in FIG. 16.

FIG. 18 represents a transformation processing operation (10121b) for transforming into the function "let" for the declaration of local variables.

At a first step 301, a title or name "let" is displayed. Subsequently, the processing operation of the declaration portion for the local variables ("parameter1", "parameter2", - - - ) is effected at steps 302, 3021 and 3022. At a step 3021, the respective initial value portions of the local variables ("initial value1", "initial value2", - - - ) to be defined are transformed into visual expressions thereof. This processing operation is carried out in such a way that the basic processing operation shown in FIG. 16 is recursively called to be performed. At a step 3022, a box indicating the declaration of local variables ("variable1", "variable2", - - - ) is drawn into which names of these variable are written.

A step 303 corresponds to the processing operation for the body portion of the function "let". In accordance with the language specification of Common LISP, the body portion of the function "let" is similar to the processing operation of sequential execution "progn", namely corresponds to such a processing operation in which successively arranged processes are sequentially executed. As a consequence, since the transformation into the visual expression is the same as the sequential expression "progn", the transformation process of the sequential execution shown in FIG. 19 is called to be executed.

Finally, an entire portion is surrounded by a frame at a step 304. As a result, it becomes a visual expression No. 3 in the transformation rule list shown in FIG. 15a.

Figure 19:
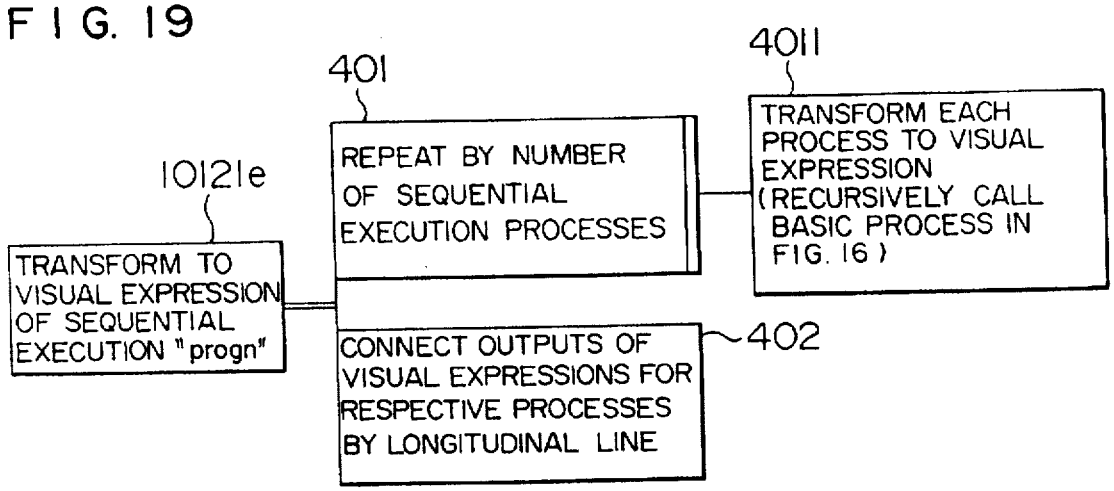
FIG. 19 is a PAD diagram of a basic process for a step 10121e shown in FIG. 16.

FIG. 19 illustrates a transformation process of a sequential execution "progn" (a step 10121e).

At steps 401 and 4011, the basic processing operation shown in FIG. 16 is called and the transformation to the visual expression is executed with respect to each of the processing operations arranged in the sequential execution "progn" ("process1", "process2", - - - ).

Thereafter, at a step 402, left sides (output sides) of the visual expression obtained by transforming the respective processing operations are connected with each other by a longitudinal line. As a consequence, it becomes a visual expression No. 6 of the transformation rule list shown in FIG. 15b.

Figure 20:
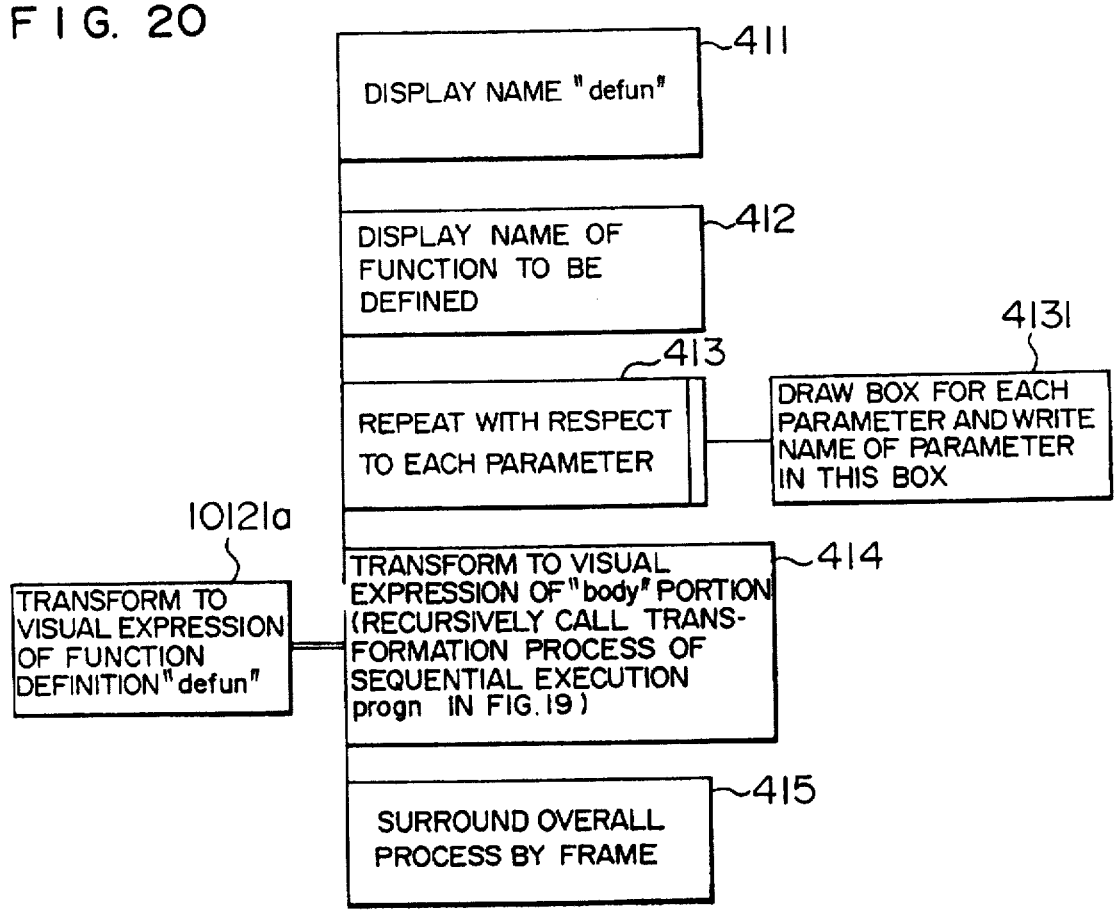
FIG. 20 is a PAD diagram of a basic process for a step 10121a shown in FIG. 16.

In FIG. 20, there is shown a transformation processing operation (step 10121a) of a specific function "defun".

At a step 411, a name "defun" is displayed.

Next, a title of function to be defined is represented at a step 412.

Furthermore, a processing operation of a parameter portion ("parameter1", "parameter2", - - - ) is performed at steps 413 and 4131.

At a step 414, the transformation process of the sequential execution "progn" shown in FIG. 19 is called and the transformation of the body portion is executed, which is similar to the step 303 shown in FIG. 18.

Finally, an overall process is surrounded by a frame at a step 415. As a consequence, it becomes the visual expression No. 2 in the transformation rule list shown in FIG. 15a.

Figure 21:
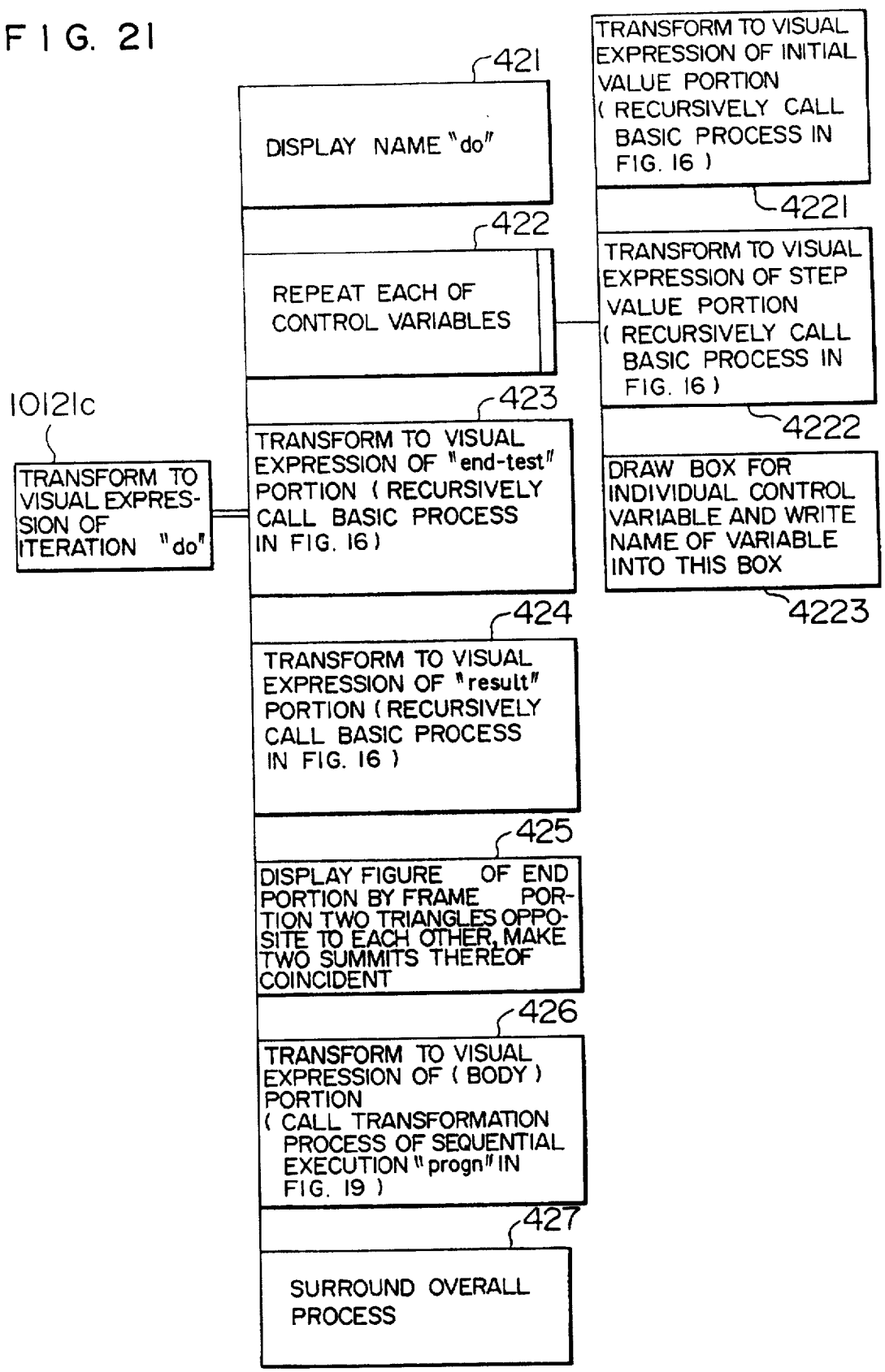
FIG. 21 is a PAD diagram of a basic process for a step 10121c represented in FIG. 16.

FIG. 21 represents a transformation processing operation for an iteration "do" (a step 10121c).

At a first step 421, a name "do" is displayed.

Subsequently, at steps 422, 4221, 4222 and 4223, a processing operation for a portion of iterative control variables is carried out. The basic processing operation shown in FIG. 16 is called repeatedly so as to perform the transformation with respective to an initial value part ("initial value1", "initial value2", - - - ) and a step value part ("step value1", "step value2", - - - ), and boxes for the corresponding control variables ("variable1", "variable2", - - - ) are drawn, into which names of these variables are written.

Next, at steps 423, 424 and 425, the transformation from the portion of the iteration "end-test" process into the visual expression is carried out. Both an "end-test" for the parameter and a "result" thereof are transformed into the visual expressions thereof by calling the basic processing operations shown in FIG. 16. Finally, a figure representative of the end-test (figure made by positioning summits of two triangles opposite to each other) is displayed.

Next, at a step 426, the transformation process for the sequential execution "progn" shown in FIG. 19 is called, whereby the transformation into the visual expression of the body portion is carried out.

Finally, an overall process is surrounded by a frame at a step 427. As a consequence, it becomes the visual expression No. 4 in the transformation rule list shown in FIG. 15a.

Figure 22:
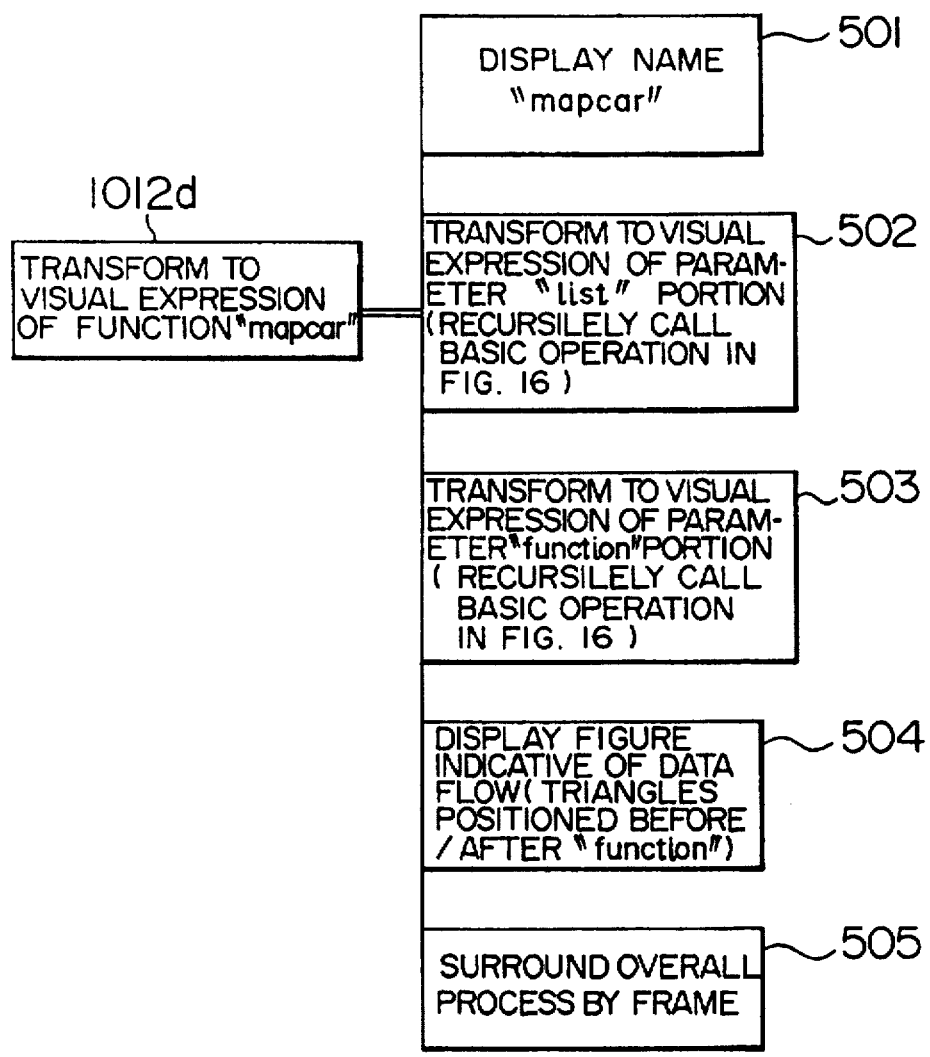
FIG. 22 is a PAD diagram of a basic process for a step 10132d shown in FIG. 16.

FIG. 22 represents a transformation process of a function "mapcar" (step 10121d).

In general, LISP has a group of functions so-called as a map function, which corresponds to a function group in which a list is handled as an input, an instructed processing operation is performed, and a result thereof is returned as a list. Since this function is similar to a so-termed "mapping" for a set, the above-described name is given. The function "mapcar" corresponds to one of the function group, in which a list is used as an input, a processing operation designated by each of the elements is performed, and then another list for the processing results of the respective elements is returned.

At a first step 501, a name "mapcar" is displayed.

Next, at a step 502, a transformation processing operation for a "list" portion of a parameter is carried out. This transformation processing operation is carried out in such a manner that the basic processing operation shown in FIG. 16 is recursively called.

Furthermore, at a step 503, a transformation processing operation for a "function" portion of a parameter is performed. This transformation processing operation is similarly performed by recursively calling the basic processing operation shown in FIG. 16.

Then, at a step 504, a figure indicative of a data flow, namely triangles before and after the "function" is displayed.

Finally, an overall process is surrounded by a frame at a step 505. Consequently, it becomes a visual expression No. 5 in the transformation rule list shown in FIG. 15a.

Figure 23:
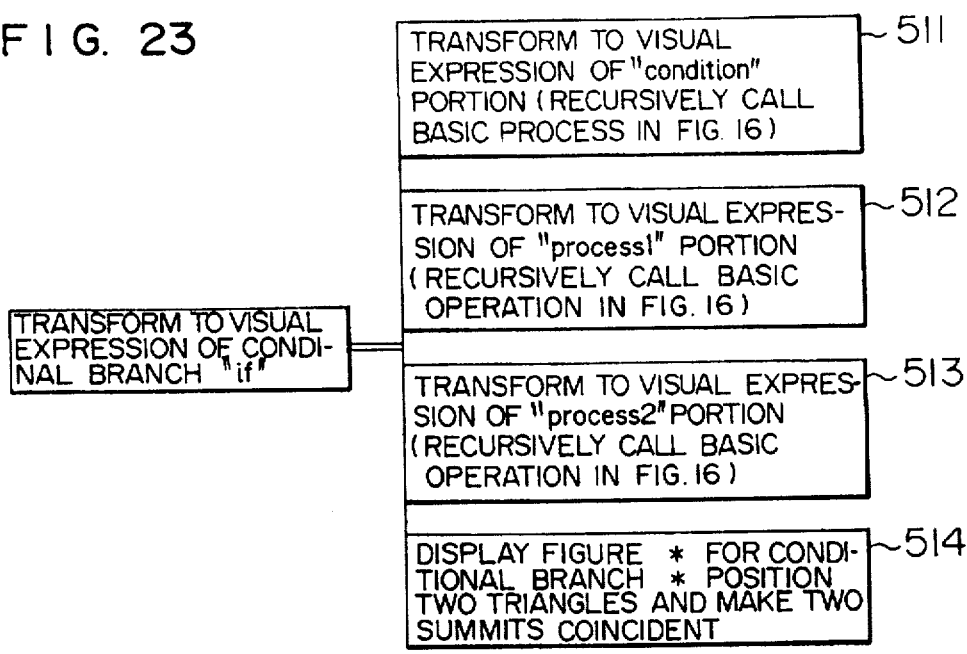
FIG. 23 is a PAD diagram of one process contained in a basic process for a step 10121 shown in FIG. 16.

FIG. 23 illustrates a transformation processing operation of a conditional branch "if".

At a first step 511, the basic process shown in FIG. 16 is recursively called, and the transformation processing operation into the visual expression of "condition" portion is carried out.

Next, at a step 512, the basic operation shown in FIG. 16 is recursively called, and the transformation processing operation into the visual expression of "process1" portion (i.e., process for such a case that the "condition" is equal to "true") is performed.

Furthermore, at a step 513, the basic process defined in FIG. 16 is recursively called, and then the transformation processing operation into "process2" portion (i.e., process for such a case that the "condition" is equal to "false") is performed.

Finally, a figure indicative of the conditional branch is displayed at a step 514. Accordingly, it becomes a visual expression No. 7 in the transformation rule list shown in FIG. 15b.

Figure 24:
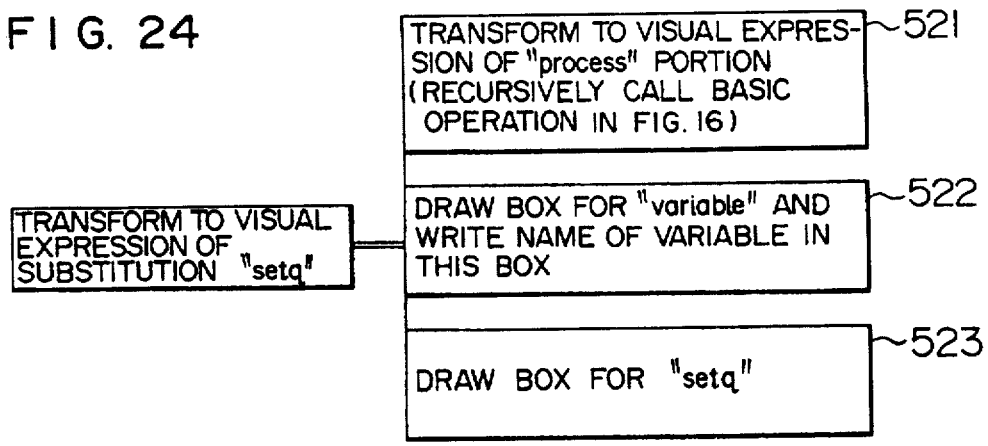
FIG. 24 is a PAD diagram of a single process contained in a basic process for a step 10121 represented in FIG. 16.
Figure 25:
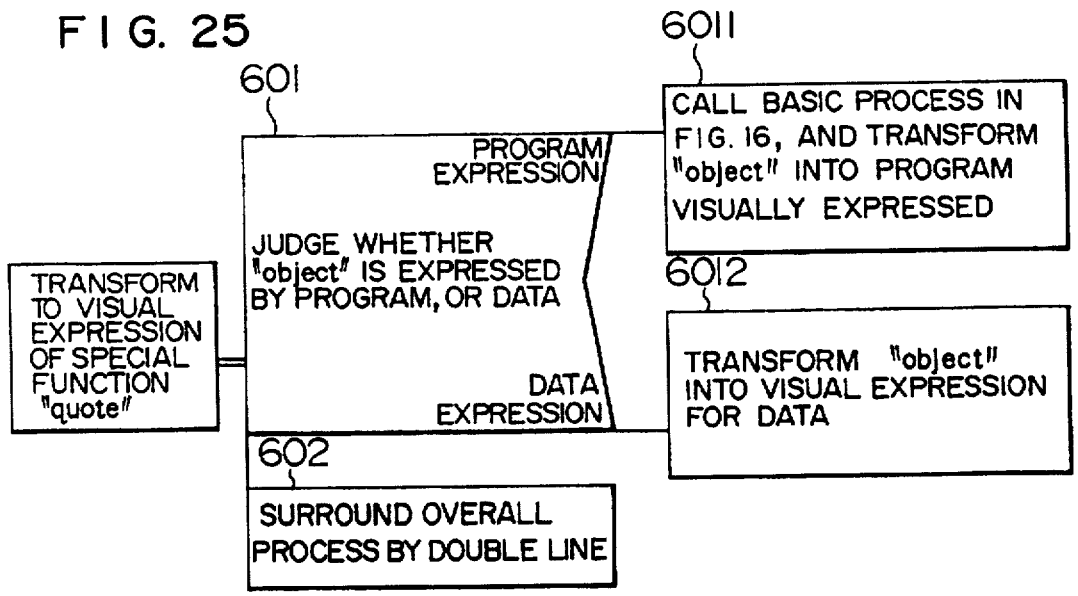
FIG. 25 is a PAD diagram of a fundamental process for one process contained in the step 12121 shown in FIG. 16.

FIG. 24 illustrates a transformation processing operation of a substitution "setq".

At a first step 521, the basic process shown in FIG. 16 is recursively called and then the transformation processing operation into the visual expression of "process" portion is performed.

Subsequently, at a step 522, a box for "variable" is drawn, into which a title of this variable is written.

Finally, at a step 523, a box for surrounding an entire process is drawn, so that it becomes the visual expression No. 8 in the transformation rule list shown in FIG. 15b.

FIG. 26 illustrates a transformation processing operation of a specific function "quote".

If either a list or a symbol given by an "object" of a parameter for the function "quote" is temporarily handled as the data, there are some cases that the "object" is wanted to be handled as the function for the program, or the variable thereof, depending upon the subsequent processing operation. Since in accordance with the visual expressions of the present invention, there are differences in the visual expressions when it is expressed as the program and also when it is expressed as the data, a judgement is required whether it is handled as the data, or program.

This judgement may be performed, depending upon the statements before and after the object. For instance, there is such a case that it is given as the "function" of the parameter for the above-described "map" function. However, in general, a user must make designation. Therefore, for instance, in case of "default", it may be expressed as a data form, and a user may individually designate either the data expression, or program expression, if necessary.

The transformation processing operation of the function "quote" in which the above-described points have been considered, is represented in FIG. 26.

At a first step 601, a judgement is made whether the "object" should be expressed as program, or as data.

When it is judged that the object must be expressed as the program, the process is advanced to a step 6011 at which the basic process shown in FIG. 16 is called and thus the "object" is transformed into the visual expression.

To the contrary, when it is judged that the object must be expressed as data, the process is advanced to a step 6012 at which the object is transformed into the corresponding visual expression. When the "object" corresponds to the list, the visual expression may be achieved in a tree structure. When the "object" is other than a list, the "object" is directly outputted (in the form of characters).

Figure 26B:
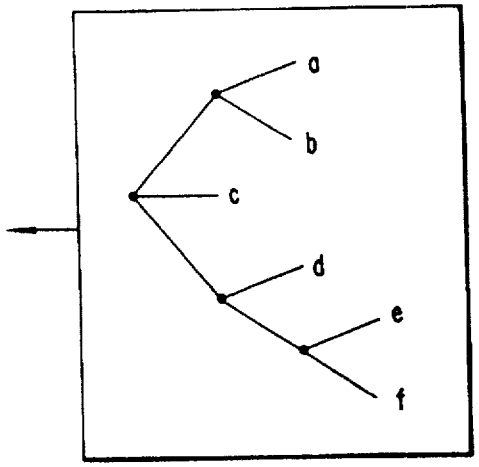
FIG. 26b represents an example for showing the data shown in FIG. 26a by way of the program display method according to the present invention.

Finally, at a step 602, an overall process is surrounded by a double line. As a consequence, when the "object" is designated to be expressed as the program, if the program shown in FIG. 6a is given, the visual expression as shown in FIG. 14 may be obtained. When an instruction is made to express the "object" as the data when the input shown in FIG. 26a is given, the shape of the visual expression becomes a tree structure as shown in FIG. 26b.

A description will now be made of a "backquote" of the item No. 10 in the transformation rule list shown in FIG. 15b.

The "backquote" is provided to expand the function of the function "quote", and an indication backquote (') is attached to a front of an "object". Although the object designated by the backquote is handled as not the program, but as the data, which is similar to the function "quote", when a "comma" has been attached to the front of the item therein, this object is again evaluated.

The visual expression on the backquote of the item No. 10 in the transformation rule list shown in FIG. 15b, represents the above-explained functions, in which the portion that is not evaluated is expressed in a shadow, and the portion that is evaluated is expressed in a transparent window cut within the shadow. The backquote may be used in a multiple mode. In the case where the shadows are overlapped with each other, the shadow for the overlapped portion indicates high density. Also, the backquote may be expressed not by the shadow, but by a hatching line.

Figure 27A:
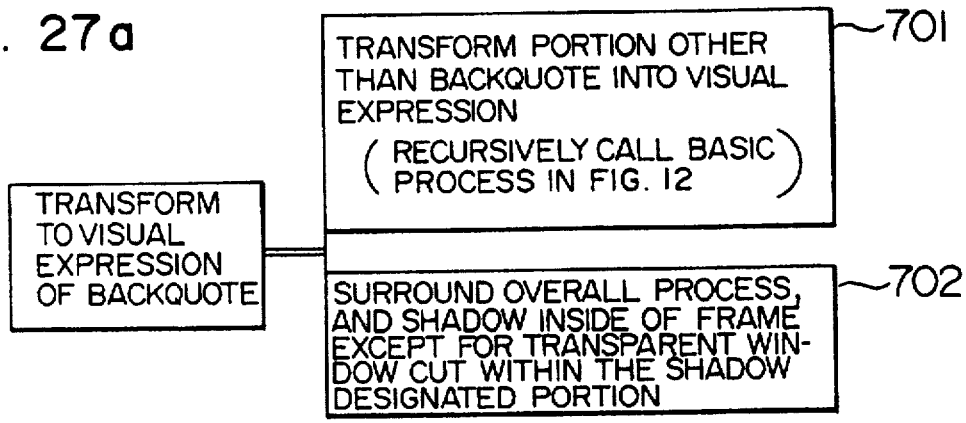
FIGS. 27a and 27b are PAD diagrams of a process contained in a step 10122 shown in FIG. 16.
Figure 27B:
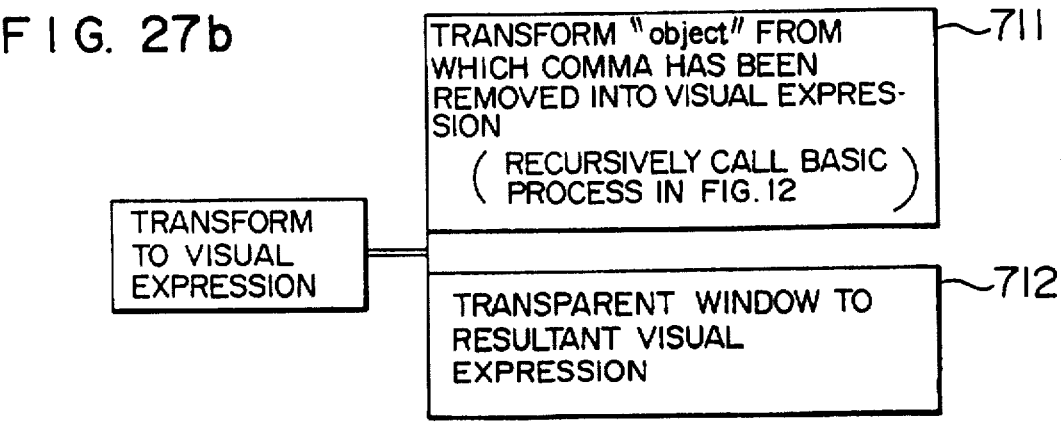

The transformation processing operation of the backquote into the visual expression in which the above-described points have been considered, is represented in FIGS. 27a and 27b. FIG. 27a illustrates the transformation processing operation with respect to the backquote per se, whereas FIG. 27b illustrates the transformation processing operation with respect to the list to which the comma has been attached.

In FIG. 27a, the transformation processing operation for transforming the portion other than the backquote into the corresponding visual expression is carried out at a step 701. This transformation processing operation is performed by recursively calling the basic process as shown in FIG. 16.

At a step 702, an overall process is surrounded by a frame, and a shadow is attached to the contents within the frame, except for the portion designated by a transparent window cut within the shadow.

In FIG. 27b, the transformation processing operation for transforming the portion except for the comma into the corresponding visual expression is performed at a step 711. This transformation processing operation is performed by recursively calling the basic process shown in FIG. 16.

At a step 712, a frame the inside of which is transparent is attached. This frame is used to designate at the above-described step 702 shown in FIG. 27a by way of a transparent window cut within the shadow.

Described above is the process flows of the transformation program 3 with respect to the transformation processing operations corresponding to the program structure elements shown in FIGS. 15a and 15b as the major transformation processing operation.

It should be noted that there are such program structure elements not shown in FIGS. 15a and 15b with respect to the LISP program. These program structure elements may be displayed by employing a visual expression similar to that shown in FIGS. 15a and 15b. For instance, a visual expression of a description element "lambda" for defining an unnamed function may be achieved by employing a visual expression made by removing the portion of the function name from the visual expression for defining the function "defun". Also, scopes of labels for "block", "goto" statements (expressed by the special function "go" in LISP) which may define a scope of non-local exit may be visually expressed by a visual expression similar to the declaration of local variables "let". Furthermore, a portion of process function with respect to sequence type data ("sequence type" implies an abstract data type made by combining a vector type as one-dimensional array with a one-dimensional list type) which is a feature of the Common LISP, may be visually expressed by utilizing the visual expression of the "map" function.

It should be understood that although the rectangular frames are used to visually express the partial structure of the programs, arbitrary figures indicative of the domains for covering the programs or grouped data may be employed. For example, other closed figures may be employed, and also the block structure may be visually expressed by the longitudinal lines with wide widths as represented in FIG. 28.

In FIG. 28, the longitudinal lines 81, 82 and 83 are visual expressions for expressing the blocks by way of the form "let" for local variable declaration. As apparent from this figure, even when such longitudinal lines are utilized, the scopes of variables defined by the blocks and the structure relationship among the respective blocks may be readily visually expressed.

Although all of the above-described programs have been visually expressed in the above-described preferred embodiments, the program expressed by characters may be partially left. For instance, a degree of understanding a program may be increased by attaching the frame structure expression according to the present invention to the program normally expressed by the characters. To achieve this idea, the transformation processing operation shown in the above-described preferred embodiments may be partially applied.

Then, a description will now be made of the reverse transformation program 4.

The reverse transformation may be realized in such a manner that a visual expression of a program outputted from either a display device, or a printer is read out by utilizing the pattern recognition technique, the read visual expression is analyzed so as to produce structural data for visual expressions, which expresses elements for visual expressions and relationships among these elements, a partial structure of the program is generated from the structural data, and also the respective partial structures are combined with each other so as to form a program expressed by characters. Moreover, if there are structural data for visual expressions outputted from the display device or printer, these structural data may be utilized so that the process for reading the visual expression by way of the pattern recognition technique is no longer required.

Usually, the structural data is internally produced when the program expressed by the characters is visually expressed. Also, the structural data may be produced even when the visual expression is inputted by employing the editing program 6 shown in FIG. 1. In addition, the structural data may be corrected with employment of the editing program 6 shown in FIG. 1 (when the structural data has been corrected, a visually-expressed program corresponding to the correction result is displayed).

Figure 29:
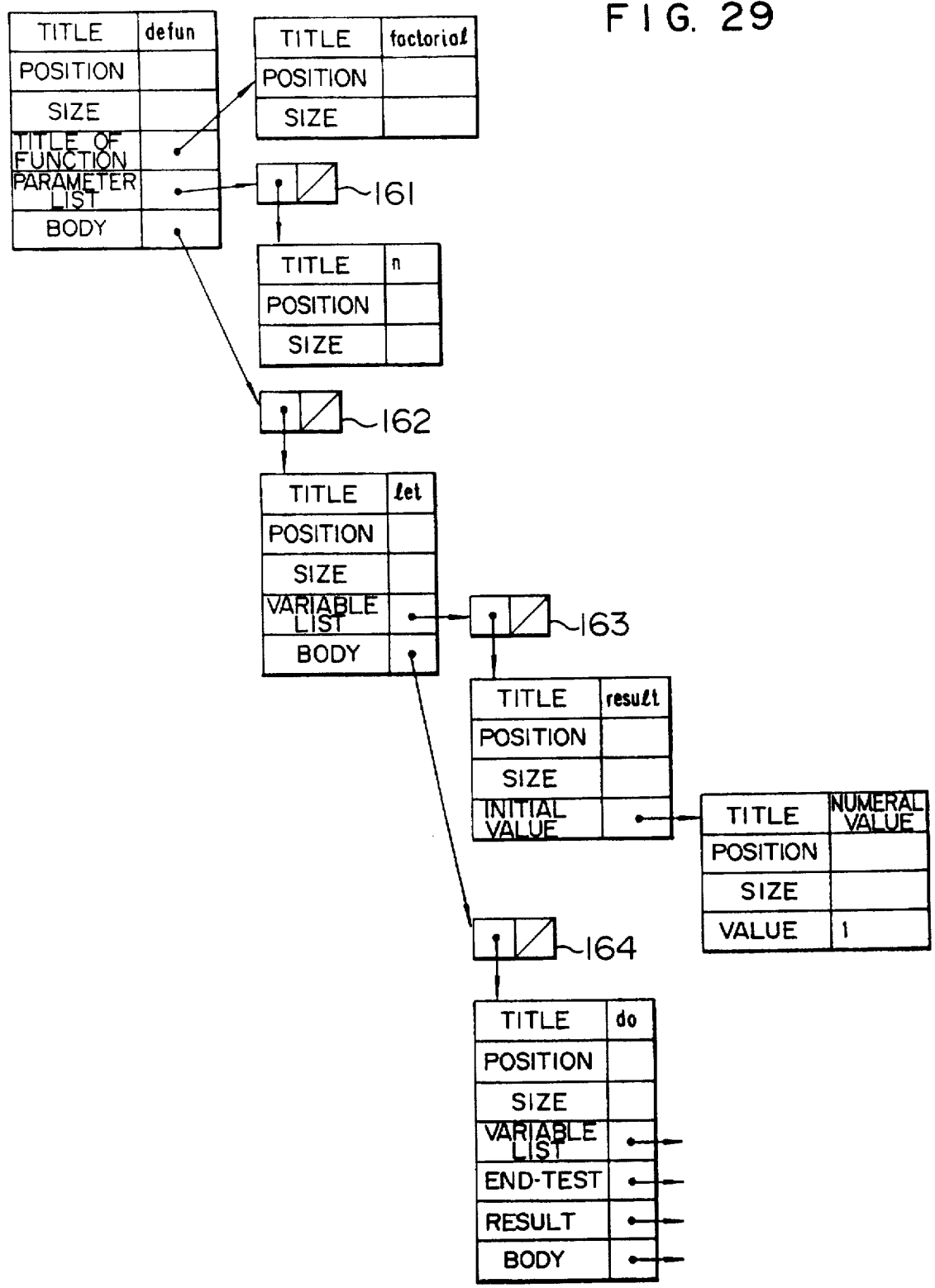
FIG. 29 schematically illustrates an example of structural data.

In FIG. 29, there is shown an example of structural data (a portion). This corresponds to the example of the factorial function as shown in FIG. 2a.

This structural data is made up by a list structure in which a plurality of elements (referred to as "cells" hereinafter) are connected with each other. The cells correspond to partial structures of a program or data and the like which are employed therein, and own titles "slot" corresponding to the partial structures. Further, the cells have such information related to display positions and display size required for the visual expressions. The information on the display positions and display sizes are set when the program expressed characters is transformed into the program visually expressed, or when the visual expressions are inputted/edited.

In addition, when there are parameters, variables and bodies in the partial structure of the program, the cells own additional slots with respect to the parameter lists, variable list and bodies. The parameter lists, variable lists and bodies per se are set as separate cells, and are coupled to the above-described additional slots. It should be noted that figures (161 to 164 in FIG. 29) constructed of two boxes are prepared so as to group a plurality of lower level cells corresponding to a slot into a single list ( . . . ). (Note that in the example shown in FIG. 29, all of the item quantities which have been set to the slots capable of setting plural items, become a single item).

FIG. 30 illustrates the reverse transformation program 4 for producing a program expressed by characters from the structural data shown in FIG. 29.

First, at a step 801 of FIG. 30, a check is made whether or not there is an additional slot such as a parameter list, a variable list and a body, while observing the cell with the highest order in the structural data.

If the additional slot is present, the process is advanced to a step 8011, at which the processing operation shown in FIG. 30 is recursively called and then character expressions corresponding to contents of cells designated by these additional slots every additional slots (8011).

Thereafter, the process is advanced to a step 802, at which the contents of these cells are transformed into the program expressed by characters with reference to the transformation rule lists shown in FIGS. 15a and 15b. These transformation processing operations may be realized by reversely reading the transformation processing operations shown in FIGS. 17 to 25, 27a and 27b.

When the processing operation for the cell with the highest order in the structural data at the step 802 has been accomplished, the overall programs expressed by characters may be obtained.

If the resultant program expressed by characters is written in the interpreter languages such as the LISP language, this program is directly executable. Since this program may be executed at higher speed ? when it is transformed into the machine language, transformation rules capable of transforming a visual expression program into a program written in a machine language may be prepared and thus the program written in the machine language may be directly produced from the visual expression program.

It should be noted that a program expressed by characters (written in either a high level language, or a machine language) is not generated from a visual expression program, but the program visually expressed may be executed without any modification by utilizing the interpreter techniques.

Next, the display control program 5 shown in FIG. 1 will now be described.

There are some cases when information related to a program are wanted to be seen during the stage of understanding the program, while observing the visual expression. More specifically, the definition contents of subprograms, functions, and macros, declaration of variables, its initial value, or its current value thereof which are referred in the program are desired to be observed.

In such cases, these data are displayed on a part of display screen in the conventional method, or another window is opened so as to display them in the recent multiwindow system.

However, since the reference portion is merely related to the reference content in his mind of a user, these conventional display conditions are not clarified.

To the contrary, the above-described display control program 5 has such functions that the reference content is embedded in the reference portion in response to the instruction by the user, whereby the relationship between them may be visually expressed.

This display function will now be explained with reference to FIGS. 31a, 31b and 31c.

Figure 31A:
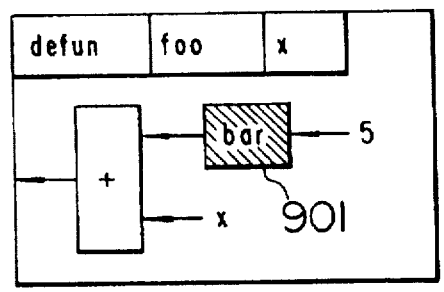
FIG. 31a is a diagram of a display condition for representing a figure to be referred.

FIG. 31a illustrates such a condition that a figure 901 indicative of referring to other portion is being displayed on a reference portion.

Figure 31B:
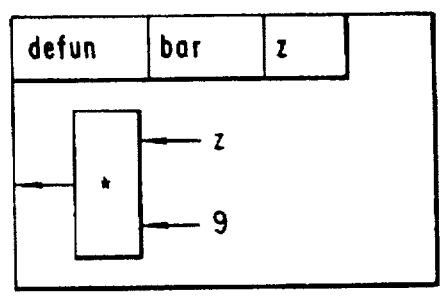

FIG. 31b is a figure for representing a reference content thereof.

Figure 31C:
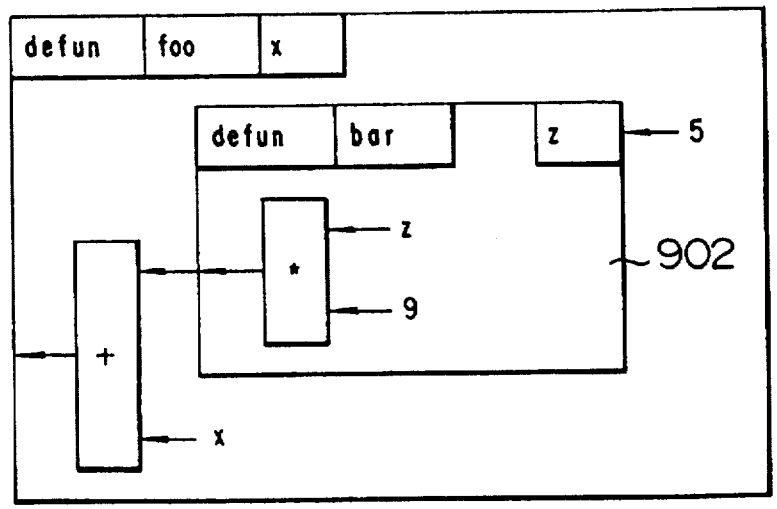

FIG. 31c represents such a state that the figure 901 displayed at the reference portion shown in FIG. 31a has been replaced by the figure shown in FIG. 31b.

A user may freely select the displays shown in FIG. 31a or 31c.

In case of the display shown in FIG. 31a, there is a feature to easily grasp an entire structure. In case of the display shown in FIG. 31c, both the reference portion and reference content are visually displayed as one body. Since the relationship between the reference portion and reference content also including the data input/output may be grasped at a glance in the display condition of FIG. 31c, the contents of the displayed program can be understood more in detail.

The display control program 5 switches the displays of FIG. 31a and 31c by modifying the cells of the structural data shown in FIG. 29. For instance, the slot for the function definition is provided with the cell corresponding to the visual expression for calling the user function, the content of this definition is embedded into the function reference portion so that the display shown in FIG. 31a is performed. Then, upon receipt of an instruction from a user, data on this definition content is entered into the slot for the above-described function definition, so that the display shown in FIG. 31c is carried out.

It should be noted that when the size of the figure for the reference content becomes too large, and therefore the original visual expression is greatly changed, if this large figure is displayed on the reference portion, it is preferable to partially display the reference content, or reduce the display size thereof, in order that there is no significant change in viewing the original figure expression.

Although the above-described preferred embodiments have been described with employment of the LISP program, it is apparent that the present invention may be also applied to other programming languages such as FORTRAN, C, PL/I and PASCAL. That is to say, if the transformation rules are properly set in accordance with the basic functions owned by these programming languages, the programs expressed by characters may be visually expressed by employing the above-explained processing operations. Conversely, according to the present invention, programs written in the various languages may be produced from the visual expression programs.

In accordance with the program display method and apparatus according to the present invention, the partial structure (block structure, iteration, list as data) of the program with range may be clearly and properly visualized. As a consequence, the program may be readily and visually understood. Also, since the display is performed in such a manner that the reference content is positioned at the corresponding reference place, the program may also be easily and visually recognized in view of this point.

On the other hand, according to the program generation method and apparatus of the present invention, the program expressed by characters corresponding to the visual expression may be generated. Since if the visual expression is employed, then intention of a programmer can be clearly expressed, the program may be readily formed directly in accordance with this intention, whereby the overall productivity may be improved.

I claim:

1. A program display method comprising the steps of:
   inputting a program expressed by characters;
   analyzing said program thereby to detect portions including a block structural portion which defines a sub-structure of said program, with local variables which are effective only within said block structural portion, and a description of data specification designated by a predetermined instruction containing a quote instruction from said program, each of said detected portions defining an environment for said sub-structure different from surrounding portions of said program such that said local variables are not accessible to said surrounding portions;

allocating detected portions to predetermined figures having a spatial boundary; and, displaying on a display screen said allocated figures at positions corresponding to positions in said program so that an effective range on which the environment of each of said detected portions influences, can be observed from the display screen.

2. The program displaying method according to claim 1, wherein each of said predetermined figures includes a rectangular frame, wherein a rectangular frame of the figure corresponding to said one detected portion is positioned inside another rectangular frame of the figure corresponding to said another detected portion.

3. The program displaying method according to claim 1, wherein each of said predetermined figures includes a longitudinal line indicative of a corresponding position of said program, wherein a longitudinal line of the figure corresponding to the one detected portion is shorter than another longitudinal line of the figure corresponding to said another detected portion.

4. The program displaying method according to claim 1, wherein said block structural portion contains a compound statement including a declaration of local variables and a plurality of execution statements.

5. The program displaying method according to claim 4, wherein said block structural portion further includes a definition of a sub-structure.

6. The program displaying method according to claim 1, wherein inside said predetermined figures, either characters or a figure indicative of a processing operation is displayed.

7. The program displaying method according to claim 1, wherein shapes of the predetermined figures are made in accordance with corresponding contents of the portion of said programs.

8. The program displaying method according to claim 1, wherein keywords attached to the figures are made in accordance with corresponding contents of the portion of said programs.

9. The program displaying method according to claim 8, wherein said keyword indicates a function of the corresponding program portion.

10. The program displaying method according to claim 9, wherein said keyword indicative of the function furthermore represents either a variable related to said function, a function, or a title of an iterative control variable.

11. The program displaying method according to claim 1, further comprising the step of judging whether or not said one detected portion refers to said another detected portion, wherein when said one detected portion refers to said another detected portion, an arbitrary selection is made between displaying a figure indicative of a reference made to said another detected portion, and displaying a figure corresponding to another partial portion by displaying the figure indicative of the reference.

12. The program displaying method according to claim 11, wherein said reference corresponds to a call of a subprogram, a reference of macro, and a reference of the variables.

13. A program display method comprising the steps of:

entering a program expressed by characters;

analyzing said program thereby to detect portions including a block structural portion which defines a sub-structure of said program with local variables which are effective only within said block structural portion, and a description of data specification designated by a predetermined instruction containing a quote instruction from said program, each of said portions defining an environment for said sub-program included therein different from those of surrounding portions of said program;

selecting a figure having a spatial boundary corresponding to one of said detected portions from a figure group which has been previously stored in a storage device; and, displaying said selected figure corresponding to a position in said program on said display screen so that an effective range on which the environment of the one detected portions influences, can be observed from the display screen.

14. A program display apparatus comprising:

program analyzing means for analyzing a program expressed by characters thereby to extract a hierarchical relationship between portions of a plurality of programs and each portion therein;

visual expressing means for assigning figures having domains to each of the portions of the plurality of programs so as to represent discrimination among a scope of variables used inside the domains, the program, and data, and for overlapping the figures which have been assigned to the respective portions based upon the hierarchical relationship among the portions wherein a variable of a specific portion of the portions is effective only within said specific portion; and, image displaying means for displaying said figures as an image.

15. A program generation method comprising the steps of:

analyzing a visual expression which includes a plurality of figures having overlapped domains;

extracting a portion of a plurality of programs from each of the figures;

extracting a hierarchical relationship of said portion from an overlapping condition of said each of the figures;

extracting a scope of variables used inside said portion wherein said variables are effective only within said portion;

discriminating between a program and data from the domains of the respective figures; and generating a program expressed by characters based upon the portion of the plurality of programs and the hierarchical relationship.

16. The program generation method according to claim 15, wherein from a shape feature of each of the figures, a portion for a plurality of programs, each having a function corresponding to the shape feature, is extracted.

17. The program generation method according to claim 15, wherein from a keyword attached to each of the figures, a portion for a plurality of programs each having a function corresponding to the keyword is extracted.

18. The program generation method according to claim 15, wherein the program expressed by characters corresponds to a program described by a sequence of machine instructions.

19. A program generation apparatus comprising:

visual expression analyzing means for analyzing a visual expression which includes a plurality of figures having overlapped domains, for extracting a portion of a plurality of programs from each of the figures, for extracting a hierarchical relationship of said portion from the overlapping domains of the plurality of figures, for extracting a scope of variables used inside said portion and for discriminating between the programs and data from the domains of the respective figures, wherein said variables used inside said portion are effective only within said portion; and, character expressing means for generating a character expression in which processing operations are described in a predetermined sequence, based upon the portion of the programs and the hierarchical relationships.

20. A program display method comprising the steps of:

inputting a program written in one of C, PASCAL, PL/I, Ada, Fortran and common LISP languages;

analyzing said program thereby to detect a block structural portion including at least one of an internal subroutine and an internal function in said program, said block structural portion defining an effective range of at least one local variable declared therein such that the at least one local variable exists only within said block structural portion;

transforming contents of said detected block structural portion to a corresponding graphical expression; and displaying on a display screen said corresponding graphical expression and a rectangular figure surrounding said corresponding graphical expression so that said effective range of said at least one local variable is represented by said rectangular figure on the display screen.

21. A program display method comprising the steps of:

inputting a program written in one of C, PASCAL, PL/I, Ada, Fortran and common LISP languages;

analyzing said program thereby to detect a block structural portion which defines a sub-structure of said program, said block structural portion prescribing an effective range of at least one local variable declared therein such that the at least one local variable is not accessible to portions of said program outside of said block structural portion;

transforming contents of said detected block structural portion to a corresponding graphical expression; and displaying said corresponding graphical expression and a longitudinal line attached on a side of said corresponding graphical expression and extending from an upper end to a lower end of said corresponding graphical expression on a display screen so that said effective range of said at least one local variable is represented by said longitudinal line on the display screen.

22. A program display method comprising the steps of:

inputting a program written in LISP language:

analyzing said program thereby to detect a quote functional portion in said program, said quote functional portion prescribing a range of a portion in said program not to be evaluated;

transforming contents of said detected quote functional portion to a corresponding graphical expression; and displaying said corresponding graphical expression and a rectangular figure surrounding said corresponding graphical expression on a display screen so that the range of said portion not to be evaluated can be observed from the rectangular figure on the display screen.

23. A program display method comprising the steps of:

inputting a program written in LISP language;

analyzing said program thereby to detect a quote functional portion in said program, said quote functional portion prescribing a range of a portion in said program not to be evaluated;

transforming contents of said detected quote functional portion to a corresponding graphical expression; and displaying said corresponding graphical expression and a longitudinal line attached on a side of said corresponding graphical expression and extending from an upper end to a lower end of said corresponding graphical expression on a display screen so that the range of said portion not to be evaluated is represented by the longitudinal line on the display screen.

24. A program display apparatus comprising:

storage means for storing a program written in one of C, PASCAL, PL/I, Ada, Fortran and common LISP languages;

program analyzing means for analyzing said program in said storage means thereby to detect a block structural portion which defines a sub-structure of a program with local variables which are effective only within said block structural portion, said sub-structure in said program, said block structural portion prescribing an effective range of at least one local variable declared therein;

program transforming means for transforming contents of said detected block structural portion to a corresponding graphical expression; and display means for displaying said corresponding graphical expression and a rectangular figure surrounding said corresponding graphical expression on a display screen so that said effective range of said at least one local variable can be observed from said rectangular figure on the display screen.

25. A program apparatus comprising:

storage means for storing a program written in one of C, PASCAL, PL/I, Ada, Fortran and common LISP languages;

program analyzing means for analyzing said program in said storage means thereby to detect a block structural portion which defines a sub-structure of a program with local variables which are effective only within said block structural portion, said sub-structure defining at least one of an internal subroutine and an internal function in said program, said block structural portion defining an effective range of at least one of the local variables declared therein;

program transforming means for transforming said detected block structural portion to a corresponding graphical expression; and display means for displaying said corresponding graphical expression and a longitudinal line attached on a side of said graphical expression and extending from an upper end to a lower end of said corresponding graphical expression on a display screen so that said effective range of said at least one local variable is represented by the longitudinal line on the display screen.

26. A program display apparatus comprising:

storage means for storing a program written in LISP language;

program analyzing means for analyzing said program in said storage means thereby to detect a quote functional portion in said program, said quote functional portion defining a range of a portion not be evaluated in said program;

program transforming means for transforming said detected quote functional portion to a corresponding graphical expression; and display means for displaying said corresponding graphical expression and a rectangular figure surrounding said corresponding graphical expression on a display screen so that the range of said portion not to be evaluated can be observed from said rectangular figure on the display screen.

27. A program display apparatus comprising:

storage means for storing a program written in LISP language;

program analyzing means for analyzing said program in said storage means thereby to detect a quote functional portion in said program, said quote functional portion prescribing a range of a portion in said program not to be evaluated;

program transforming means for transforming said detected quote functional portion to a corresponding graphical expression; and display means for displaying said corresponding graphical expression and a longitudinal line attached on a side of said corresponding graphical expression and extending from an upper end to a lower end of said corresponding graphical expression on a display screen so that the range of said portion not to be evaluated is represented by said longitudinal line on the display screen.

* * * * *